(12) United States Patent
Covington et al.

(10) Patent No.: US 6,682,417 B2
(45) Date of Patent: Jan. 27, 2004

(54) FOLDING DOOR ARRANGEMENT FOR AN ONBOARD COTTON MODULE BUILDER OF A COTTON HARVESTER AND METHOD OF OPERATION OF THE SAME

(75) Inventors: Michael J. Covington, Bettendorf, IA (US); George H. Hale, Arlington, TN (US); Jimmy R. Hargett, Bells, TN (US); Johnnie W. Oswald, Jr., Bells, TN (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 10/144,174

(22) Filed: May 13, 2002

(65) Prior Publication Data

US 2003/0211875 A1 Nov. 13, 2003

(51) Int. Cl.[7] .................................. A01F 12/60
(52) U.S. Cl. ........................ 460/119; 56/449
(58) Field of Search .................. 56/341, 344, 449, 56/361, 430, 432; 414/111, 24.5, 24.6; 100/188 R, 250, 251; 460/119

(56) References Cited

U.S. PATENT DOCUMENTS

| | | | |
|---|---|---|---|
| 2,669,368 A | 2/1954 | Kammueller et al. | 214/522 |
| 3,556,327 A | 1/1971 | Garrison | 214/522 |
| 3,691,741 A | 9/1972 | White et al. | 56/344 |
| 3,763,636 A | 10/1973 | Bliss | 56/16.4 |
| 3,813,861 A | 6/1974 | Wood | 56/344 |
| 3,827,353 A | 8/1974 | Isberg | 100/232 |
| 3,828,956 A | 8/1974 | Dubo | 214/510 |
| 3,840,134 A * | 10/1974 | Luscombe | 414/501 |
| 3,842,732 A | 10/1974 | Anderson | 100/270 |
| 3,847,072 A | 11/1974 | Garrison | 100/35 |
| 3,875,730 A | 4/1975 | Wood | 56/344 |
| 3,886,719 A | 6/1975 | Garrison et al. | 56/344 |
| 3,894,646 A | 7/1975 | Head et al. | 214/522 |
| 3,901,142 A | 8/1975 | Wood | 100/255 |
| 3,974,632 A * | 8/1976 | Van der Lely | 56/341 |
| 3,990,739 A | 11/1976 | Head | 296/56 |
| 4,046,069 A | 9/1977 | Head | 100/255 |
| 4,060,028 A * | 11/1977 | Luscombe | 100/100 |
| 4,072,242 A | 2/1978 | Cook | 214/522 |
| 4,184,425 A | 1/1980 | Haney et al. | 100/100 |
| 5,540,144 A | 7/1996 | Schrag et al. | 100/188 R |
| 6,315,514 B1 | 11/2001 | Lindsey | 414/491 |
| 6,431,062 B1 * | 8/2002 | Hawlas et al. | 100/188 R |
| 6,478,523 B1 * | 11/2002 | Meijer | 414/111 |

* cited by examiner

Primary Examiner—Árpád Fábián Kovács
(74) Attorney, Agent, or Firm—John William Stader; Collin A. Webb

(57) ABSTRACT

A folding door or gate arrangement and method of operation thereof for a mobile cotton harvesting machine including a tiltable cotton module builder. In one embodiment, folding door or gate arrangement includes primary and secondary folding door segment pivotal between a folded or closed position in at least partially closing relation to an open end of the module builder and an unfolded or open position at least substantially parallel to a floor thereof, and a door driver arrangement connected between the primary door segment and the secondary door segment including a pivoting link element that facilitates pivotally moving the secondary door segment while the module builder is pivoted to an unloading position without exerting binding or potentially damaging loads against the door segments or the drivers to provide a straight inclined path for unloading or loading cotton onto of from a surface lower than the module builder. Folding door arrangements are also disclosed which work in concert with rearward movement and tilting of the of module builder.

19 Claims, 19 Drawing Sheets

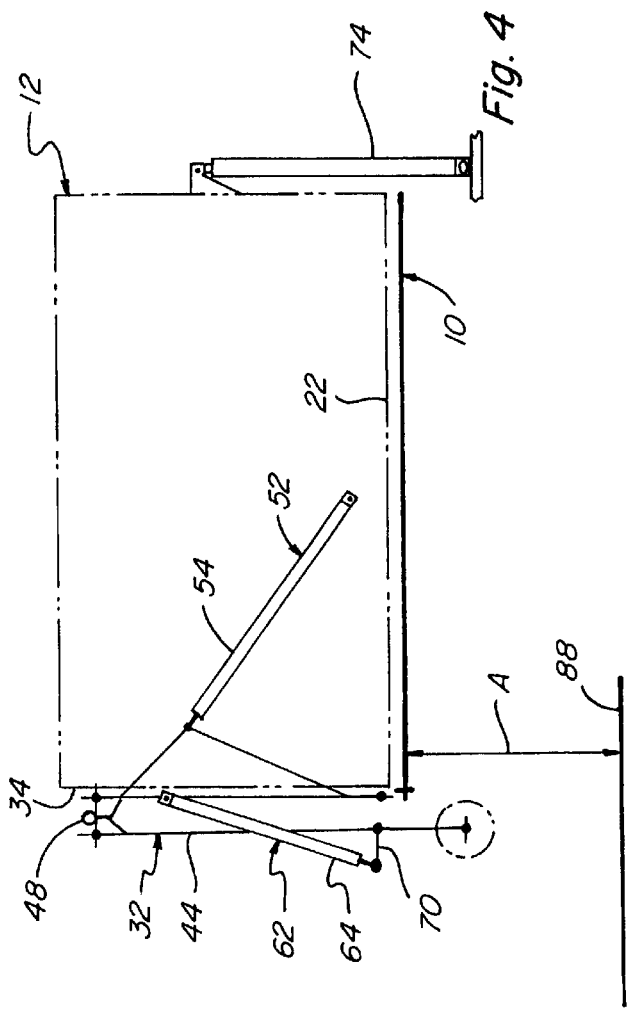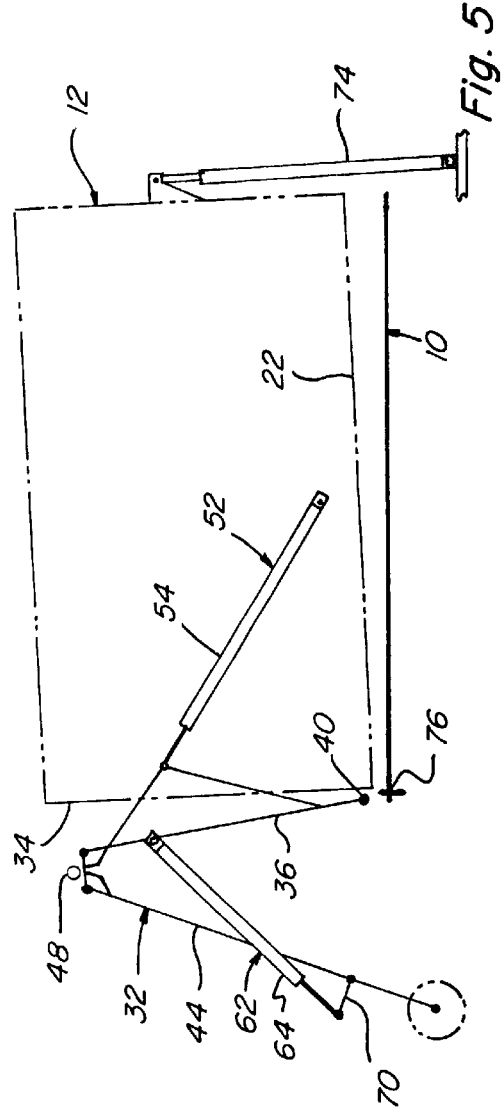

FOLDING DOOR ARRANGEMENT FOR AN ONBOARD COTTON MODULE BUILDER OF A COTTON HARVESTER AND METHOD OF OPERATION OF THE SAME

TECHNICAL FIELD

This invention relates to a folding door arrangement for a cotton harvester with an onboard module builder and method of operation of the same, and more particularly, to a door arrangement including a linkage which drives and facilitates the unfolding of the door arrangement without binding while a cotton compacting structure of the builder is being tilted from a module building position to an unloading position, and which also facilitates the easy re-folding of the door arrangement after unloading.

BACKGROUND OF THE INVENTION

Cotton module builders which are separate from a cotton harvester and utilize a cotton compacting structure including a cotton compacting chamber having an open end enclosed by a pivoting door or gate when in a cotton compacting mode, are well known in the art. Reference in this regard, Haney et al. U.S. Pat. No. 4,184,425, issued Jan. 22, 1980 to Cotton Machinery Company, Inc., which discloses a typical known cotton module builder. The known cotton module builders such as the Haney et al. device typically have an open bottom and sit on the ground, a concrete pad or other suitable surface, as cotton is compacted in the module builder for forming the cotton module on the ground or other surface. The top of the compacting chamber is open for receiving cotton to be compacted. The front and sides of the compacting chamber and the pivoting rear door or gate which forms the rear end of the chamber are typically tapered, at a rate of about 1 inch inward for each 12 inches of vertical rise. This taper facilitates the removal of the module builder from the completed module and allows for the expansion of the sides of the cotton module to a more vertical orientation after removal of the module builder. Removal of the module builder when the cotton module is complete typically involves pivoting the rear door or gate upwardly out of the way, lifting the module builder by its tires or other means from the cotton module, and towing or driving the module builder off of the module using a tractor or the like. Once clear of the module, the rear door or gate is pivoted down thereby closing the rear of the module builder and the module builder is lowered onto the ground ready to form the next cotton module. The completed cotton module can then be picked up by a cotton module truck and transported to the cotton gin for further processing.

Cotton module trucks are well known in the art and are specifically used to transport a cotton module that has been created in the field by a cotton module builder. Reference in this regard, Lindsey U.S. Pat. No. 6,315,514 issued Nov. 13, 2001 to Module Truck Systems, Inc., which discloses a typical known cotton module truck. The cotton module truck transports the cotton module to the cotton gin and unloads it for further processing by the cotton gin. The cotton module truck consists of a flat bed with vertical front and side walls attached to the bed and a cover on top. It is open at the rear to facilitate the loading and unloading of a cotton module onto or off of the flat bed from the rear of the truck. The flat bed typically has drag chains running parallel to the bed front to rear. The drag chains move along the bed and are reversible to facilitate loading and unloading of the cotton module. Vertical clearance of the module truck bed to the ground is equal to or less than that for standard over the road hauling trucks and can vary according to state regulations. Typically, a cotton module is about 7.5 feet wide by 7.5 to 8.5 feet high by 32 feet long. The module truck bed is typically about 9 feet wide by 36 feet long. If covered, the height from bed to cover is sufficient to handle 8.5 feet high modules and stay within state height regulations for over the road hauling trucks. Total length of a module truck is typically 48 feet or less. For loading and unloading, the module truck bed typically tilts such that it forms an angle to the ground with the rear of the bed near the ground. The angle the bed forms to the ground is sufficient to allow the loading and unloading of the cotton module from or onto the ground without fracturing or breaking the module apart.

Advantageously, current known cotton module trucks are separate from cotton harvesters, and because the trucks do not have to traverse difficult terrain or provide clearance for the crop to pass underneath during use, they are typically lower to the ground compared to a cotton harvester. This makes it easier to unload a cotton module from the truck. To facilitate loading and unloading, the bed of the module truck can pivot about a point that is approximately half way along the bed. Thus, the rear of the bed will come close enough to the ground and obtain the needed angle with respect to the ground for unloading of the cotton module onto the ground without the need for a rear door or gate to drop down, and the rear of a module truck is typically open.

Presently, it is desired to provide an onboard module building capability for cotton harvesters, including a door or gate structure constructed and operable for safely unloading a completed or partially complete module from the module builder, which will be relatively high above the ground or other surface onto which the module is to be unloaded. Due to the required height of the module builder above the ground for traversing fields and a maximum angle of about 25 degrees that the door or gate can be oriented relative to the ground to avoid damaging the cotton module during transition to the ground or other surface, the door or gate structure will have to be relatively long and/or the module builder lowerable. However, when the harvester is in a transport mode for travel over public roads and thoroughfares, the height of the door or gate cannot exceed governmental restrictions on the overall height of cotton harvesters, in order to safely pass beneath utility lines and bridges.

SUMMARY OF THE INVENTION

According to one preferred aspect of the present invention, a folding door or gate arrangement and method of operation thereof for use with an onboard module builder of a cotton harvester and which provides the above discussed properties, is disclosed. The cotton module builder includes a cotton compacting structure including a cotton compacting chamber having an open end, and a floor located in the chamber, at least the floor being tiltable to a tilt or unloading position so as to extend downwardly toward the open end so as to be oriented at a predetermined incline relative to a surface lower than the module builder for unloading cotton from the chamber onto the surface. The folding door or gate arrangement includes a primary door segment mounted to the cotton module builder for pivotal movement between a folded or closed position in at least partially closing relation to the open end and an unfolded or open position at least substantially parallel to the floor, and a secondary door segment pivotally mounted to the primary door segment. The door arrangement additionally includes a primary door driver arrangement connected between the cotton module builder and the primary door segment operable for pivotally moving the primary door segment between the closed position and the open position, and a secondary door driver arrangement connected between the primary door segment and the secondary door segment operable for pivotally moving the secondary door segment, without binding or potentially damaging loads being applied, between a generally upstanding folded position generally parallel to and beside the primary door segment and an unfolded or unloading position oriented at the predetermined incline relative to the surface lower than the module builder and in contact with or in close proximity to the surface. To achieve this capability, the secondary door driver arrangement includes at least one fluid cylinder pivotally connected between the primary door segment and a link element pivotally connected to the secondary door segment, the fluid cylinder being extendable for pivotally moving the secondary door segment from the folded position to the unfolded position, and the link element being pivotable through a predetermined range of pivotal positions when the fluid cylinder is extended and the secondary door segment is in the unfolded position for allowing the primary door segment and the floor to be pivoted relative to the secondary door segment into at least generally coplanar alignment therewith at the predetermined incline relative to the surface so as to provide a straight inclined path for unloading cotton from the chamber onto the surface, without placing a potentially damaging bending load on the fluid cylinder.

According to another preferred aspect of the invention, the at least one fluid cylinder is additionally retractable for pivotally folding the secondary door segment relative to the primary door segment from the unfolded position to a partially folded position between the unfolded and folded positions, and the link element is pivotable relative to the fluid cylinder through a predetermined range of pivotal positions when the secondary door segment is in the partially folded position for allowing the secondary door segment to be pivoted by gravity to the folded position, also without binding or placing a potentially damaging bending or side load on the fluid cylinder.

According to still another preferred aspect of the invention, a self-propelled cotton harvesting machine is disclosed, the cotton harvesting machine including at least one harvesting unit for harvesting cotton from cotton plants as the machine is moved in a forward direction over the ground. The machine includes compacting structure including walls and a floor defining a cotton compacting chamber for receiving the harvested cotton and a compactor operable for compacting the cotton received in the chamber to form a unitary compacted cotton module within the chamber. The machine includes at least one conveyor element for conveying the harvested cotton from the at least one harvesting unit into the cotton compacting chamber, and apparatus for unloading the compacted cotton module from the cotton compacting chamber onto a surface lower than the compacting chamber, including a door element mounted for movement between a generally upstanding closed position in at least partially covering relation to an open end of the compacting chamber and an open position at least generally coplanar with the floor, at least one driver operable for tilting the door element and at least the floor of the compacting structure to an incline at an angle with respect to horizontal or the surface lower than the compacting chamber of between about 10 and about 25°, while positioning an edge of the door element opposite the compacting structure in contact with or adjacent to the surface lower than the compacting chamber, and at least one cotton driver operable for moving the cotton module over the floor and the door element and into contact with the surface lower than the compacting chamber.

BRIEF DESCRIPTION OF THE DRAWINGS

FIG. 4 is a simplified schematic representation of the folding door arrangement and a module builder of the machine of FIG. 1, shown in a module building position;

FIG. 5 is a simplified schematic representation of the folding door and module builder at the initiation of unfolding of the door and tilting of the module builder;

DETAILED DESCRIPTION OF THE INVENTION

Figure 1:
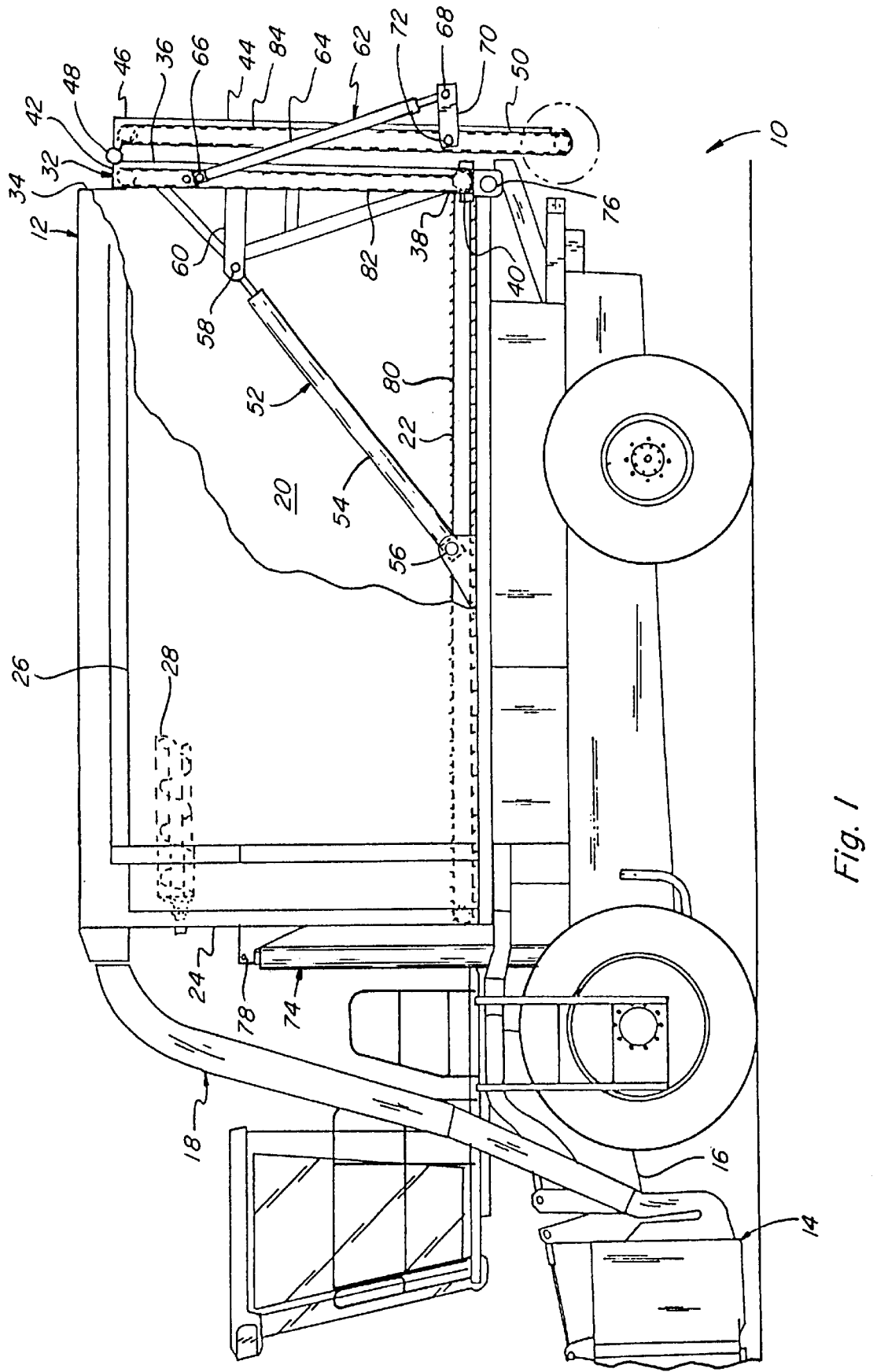
FIG. 1 is a simplified side elevational view of a cotton harvesting and module building machine including a folding door arrangement constructed and operable according to the present invention, the door arrangement being shown in a folded position.

Referring now to the drawings, in FIG. 1, a representative self-propelled mobile cotton harvesting machine 10 is shown, including a cotton module builder 12 for building a cotton module from cotton as it is harvested by machine 10. Cotton harvesting machine 10 includes a plurality of cotton harvesting row units 14 mounted transversely across a forward end 16 of machine 10 in the conventional manner, for removing cotton from cotton plants of a cotton field as machine 10 is driven in a forward direction over the field. After the cotton is removed from the cotton plants by row units 14, the cotton is conveyed through a cotton conveyor structure 18 from the row units 14 to module builder 12. Module builder 12 includes and defines a generally rectangular module building chamber 20 enclosed at its bottom by a floor 22, at its forward end by a forward wall 24, and on its sides by side walls 26, walls 24 and 26 extending upwardly from floor 22. A cotton compactor 28 is disposed in chamber 20 above floor 22 and is movable upwardly and downwardly toward floor 22 for compacting cotton received in chamber 20 from cotton conveyor structure 18 into a compacted, unitary cotton module 30, illustrated in phantom being unloaded from module builder 12 in FIG. 2.

Importantly, machine 10 includes a folding door arrangement 32 constructed and operable according to the present invention, for movement between a folded position as shown in FIG. 1 in closing relation to an open rear end 34 of module builder 12, and an unfolded or unloading position (FIG. 2) in concert with tilting of module builder 12, for unloading modules such as module 30 or loose cotton from chamber 20, and also for A picking up and loading modules 30 into chamber 20, as desired.

Figure 2:
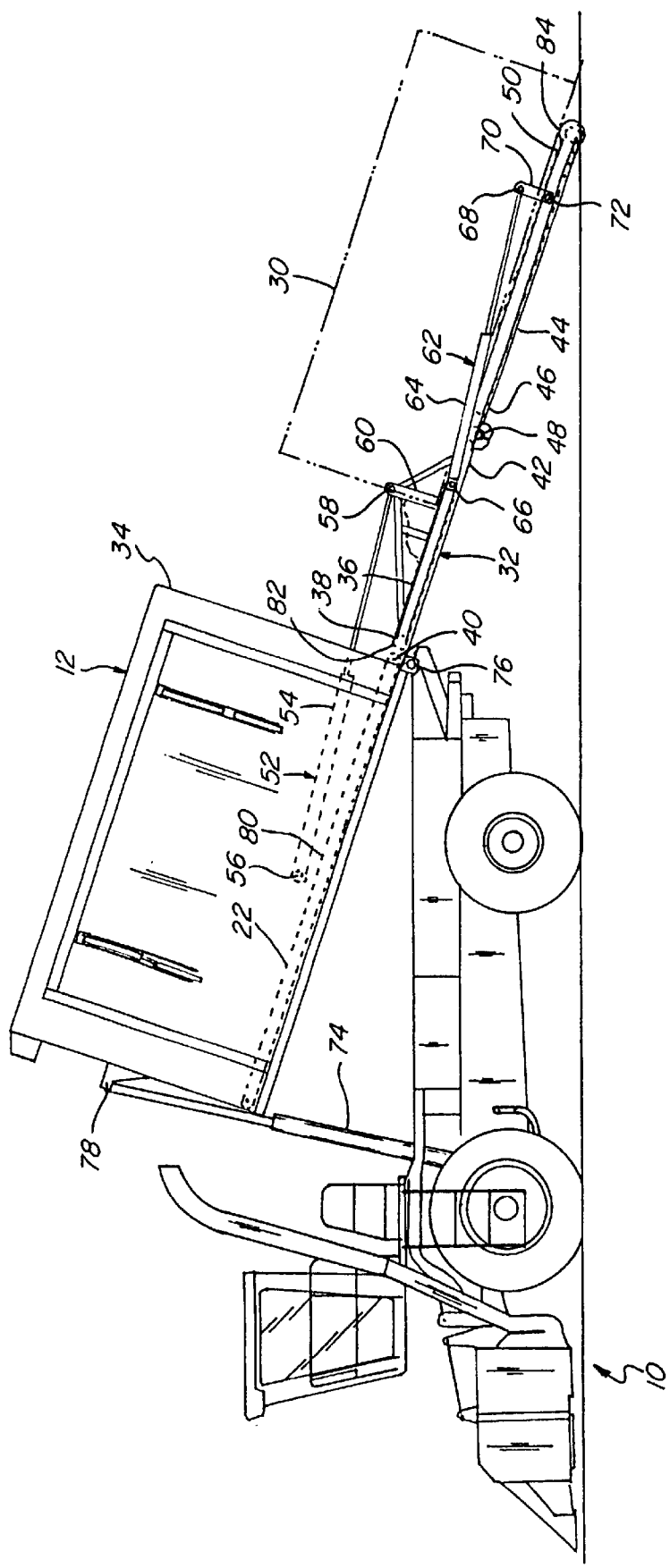
FIG. 2 is another side view of the machine of FIG. 1 showing the door arrangement in an unfolded position with a cotton module thereon in phantom.

Referring also to FIG. 2, folding door arrangement 32 includes a primary door segment 36 having a proximal or first end 38 pivotally mounted to machine 10 or module builder 12 adjacent to open rear end 34 by a pivot 40, and a distal or second end 42 opposite first end 38. Primary door segment 36 is pivotally movable between a closed position (FIG. 1) in at least partially closing or covering relation to rear end 34, and an open position (FIG. 2) at least substantially parallel to floor 22. Door arrangement 32 includes a secondary door segment 44 having a proximal end 46 pivotally mounted to second end 42 of primary door segment 36 by a pivot 48, and a free end 50 opposite proximal end 46. Secondary door segment 44 is pivotally movable between a folded position in generally side-by-side or overlaying relation to primary door segment 36 (FIG. 1), and an unfolded or unloading position aligned so as to be at least substantially coplanar with and in end-to-end relation to primary door segment 36 and floor 22.

A pair of primary door drivers 52 are pivotally connected between module builder 12 and primary door segment 36, and are operable for pivotally moving primary door segment 36 between the closed or folded position and the open or unfolded position. Primary door drivers 52 each include a fluid cylinder 54 located beside one of the side walls 26 of module builder 12 and pivotally connected at one end by a pivot 56 to module builder 12, and pivotally connected by a pivot 58 to a riser 60 attached to and extending outwardly from primary door segment 36 at a location generally between first end 38 and second end 42. Fluid cylinders 54 are retracted for positioning primary door segment 36 in the closed or folded position, as shown in FIG. 1, and are extended, as shown in FIG. 2, for positioning primary door segment 36 in the open or unfolded position.

Figure 9:
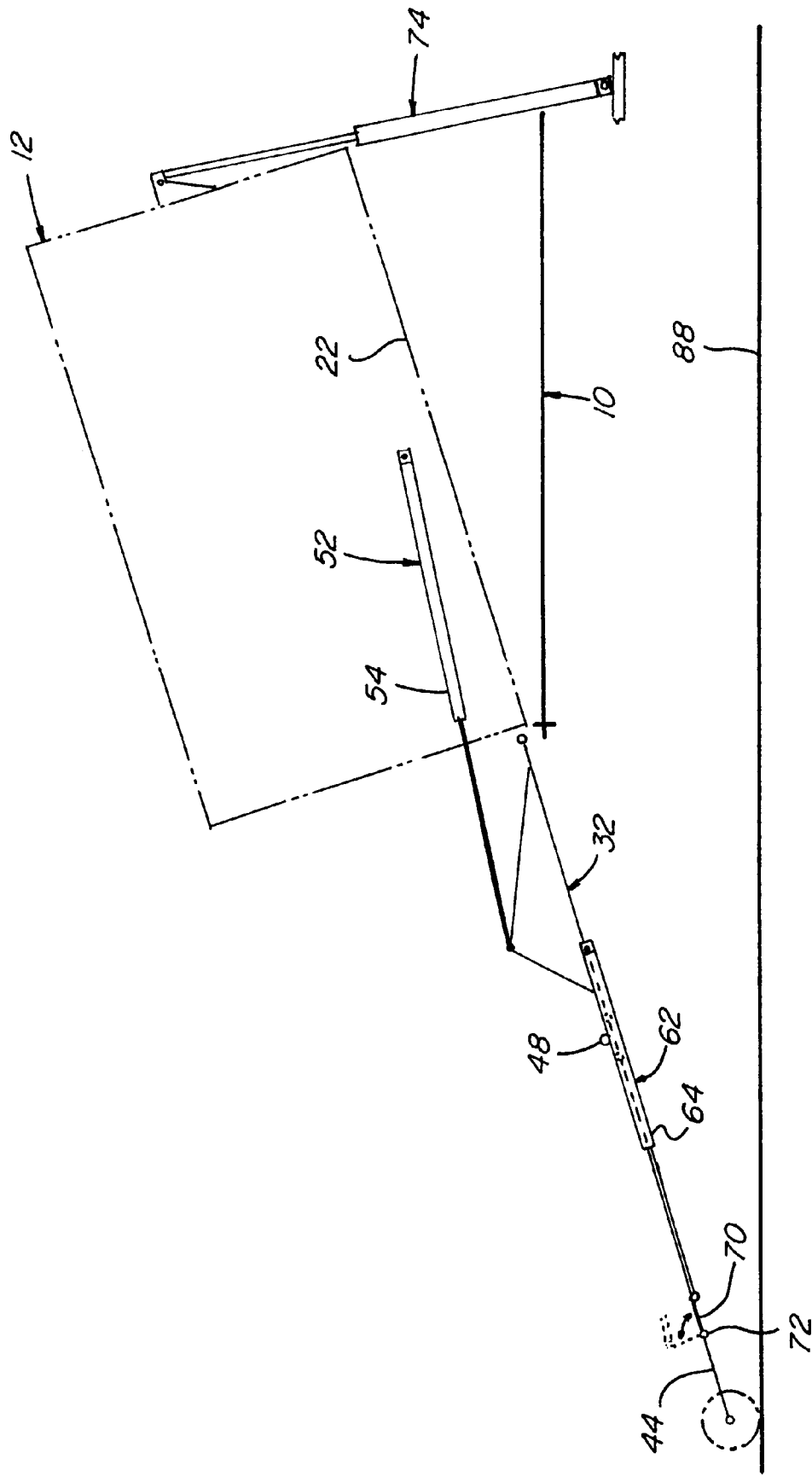
FIG. 9 is a simplified schematic representation showing initiation of folding of the door from the completely unfolded position.
Figure 10:
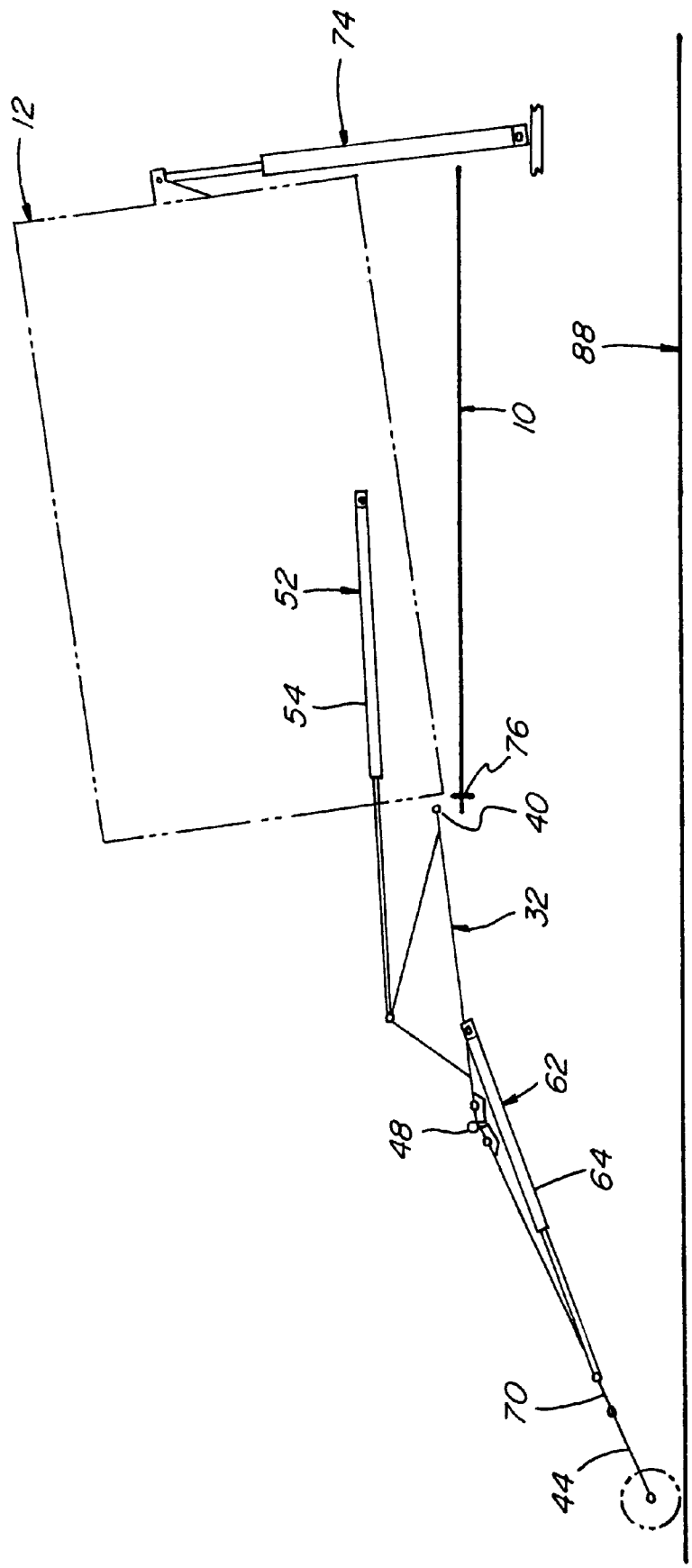
FIG. 10 is a simplified schematic representation showing the door partially folded and the module builder less tilted.
Figure 11:
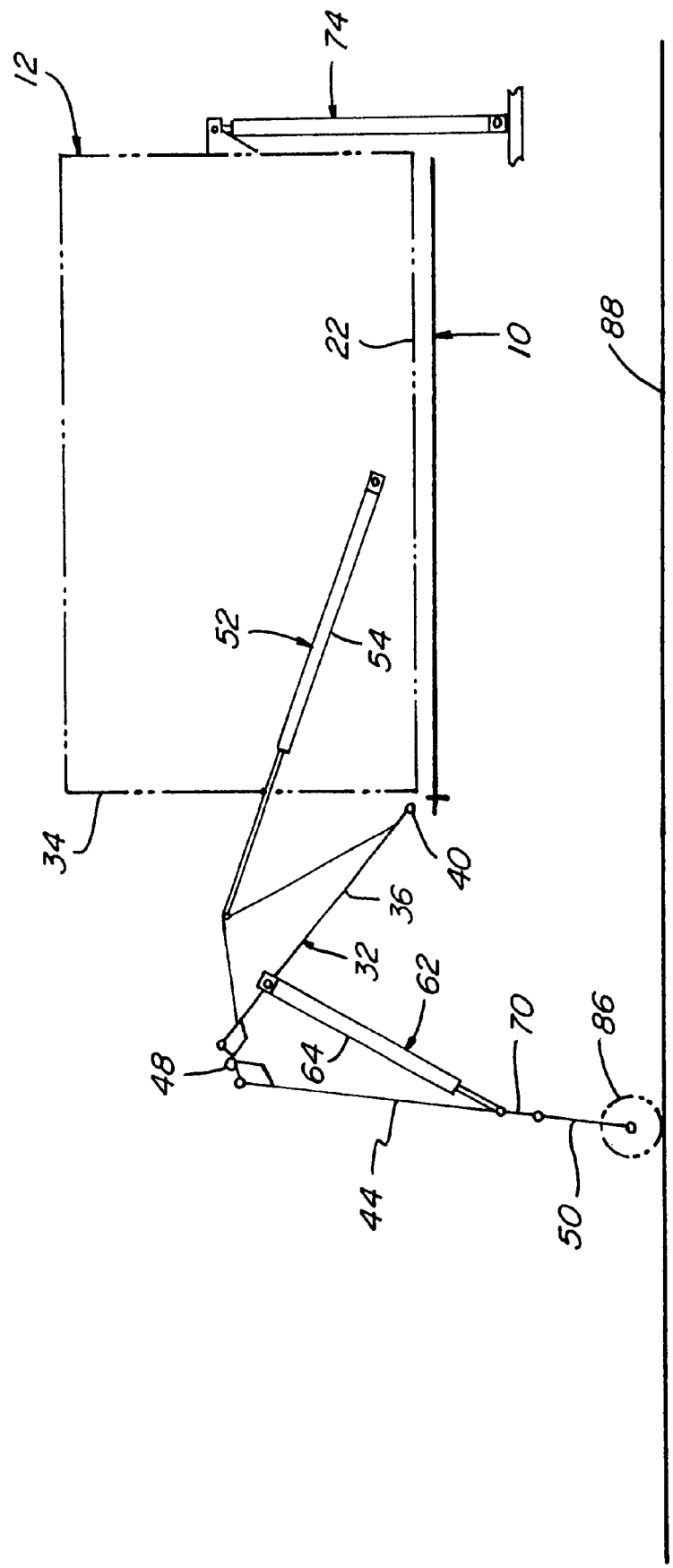
FIG. 11 is a simplified schematic representation showing further folding of the door.

Folding door 32 includes a pair of secondary door drivers 62 connected between primary door segment 36 and secondary door segment 44 and operable for pivotally moving secondary door segment 44 between its folded position and its unfolded or unloading position, secondary door drivers 62 each including a fluid cylinder 64 located beside door segments 36 and 44, cylinders 64 each including one end connected by a pivot 66 to door segment 36 and an opposite end pivotally connected by a pivot 68 to one end of a link element 70 pivotally connected at an opposite end by a pivot 72 to door segment 44. As will be explained, link elements 70 importantly are pivotable through a predetermined range of pivotal positions including a position as shown in FIGS. 1 and 2 extending outwardly in at least generally perpendicular relation to door segment 44, and a position generally parallel to door segment 44, as shown in FIGS. 9–11. The ability of link elements 70 to freely pivot within the predetermined range of pivotal movement thereof is important, as it allows door arrangement 32 to be unfolded and folded without binding of drivers 52 and 62 and application of potentially damaging side loads against fluid cylinders 54 and 64.

Here, it should be noted that a compacted cotton module, such as module 30, formed and built within module building chamber 20 by module builder 12 can have a variety of shapes and sizes, as desired or required for a particular application, which shape and size will be primarily defined by the dimensions of chamber 20. Currently, a full cotton module built by a typical known cotton module builder will have width and height dimensions each of about 7 to 8 feet, and a length dimension of about 32 feet, as discussed above. Such cotton modules are typically built by a module builder using cotton harvested by a separate harvesting machine and brought to and deposited in the module builder. In contrast, in the present application, as noted above, module builder 12 is located on and works in conjunction with cotton harvesting machine 10 for producing cotton modules from the cotton as it is being harvested. Cotton fields can be hilly and include irrigation ditches between the rows of cotton plants, as well as naturally made ditches, rivulets, swales and the like, which can present a difficult terrain to be traversed by machine 10 during the harvesting operation. As a result, such that machine 10 is not unduly heavy and unmanageable, and has a size that is not too large and can meet current height and width restrictions on agricultural machines allowed on public roads, chamber 20 is only sufficiently large to produce a cotton module 30 of half the length of the conventional modules discussed above, or about 7 to 8 feet wide by 7 to 9 feet tall by 16 feet long. A cotton module built by module builder 12 having these dimensions can be expected to weigh as much as 11,000 pounds.

In order to safely unload a cotton module of the above size and weight, it has been found that the unloading apparatus, such as folding door 32, should be oriented at no more than about a 25° angle to horizontal or a surface lower than module builder 12 onto which the module is to be unloaded. For a cotton harvesting machine with a module building capability such as machine 10, floor 22 of module builder 12 can be expected to be 5 feet or higher above a ground surface on which machine 10 is located and onto which a cotton module is to be deposited. Thus, to provide an inclined path or ramp for unloading the module onto the lower surface at less than about a 25° angle, either a relatively long ramp must be used, or at least the rear end of the module builder lowered to allow using a shorter ramp. In the present instance, module builder 12 is not lowered, so folding door 32 is relatively long when unfolded, primary door segment 36 being about 8 feet long, and secondary door segment 44 being about 11 feet long for a combined length of about 19 feet. Here, it should be understood that other sizes and geometries are also contemplated according to the present invention, as will be disclosed hereinafter. In regard to the present embodiment, however, it should be appreciated that for a relatively long ramp such as provided by door arrangement 32, and the significant weight of cotton modules such as module 30 to be conveyed thereover, door segments 36 and 44 by necessity must be of relatively strong construction, and as a result, relatively heavy. Thus, when being unfolded and folded, wherein door segments 36 and 44 are extended in essentially cantilever relation to module builder 12, substantial loading of pivots 40, 48, 56, 58, 66, and 68, as well as fluid cylinders 54 and 64 will be encountered, which loads have been observed to be sufficient to bend cylinders similar to cylinders 54 and 64.

To effect the tilting of module builder 12 to a desired angle of inclination relative to a surface onto which a cotton module is to be unloaded, or from which a cotton module is to be loaded, machine 10 includes at least one and preferably two tilt drivers 74 suitably mounted and located for tilting module builder 12 about a pivot 76 located adjacent to rear end 34. The preferred tilt driver 74 shown in FIGS. 1 and 2 is a conventional fluid cylinder including an upper end connected by a pivot 78 to a forward end of module builder 12 and an opposite end (not shown) pivotally connected to machine 10 beneath the forward end of module builder 12.

To effect forward to rearward movement of a cotton module such as a module 30 from module building chamber 20 and onto primary door segment 36, floor 20 includes at least one cotton driver 80 which preferably is a conventional drag chain operable in a forward to rearward direction for dragging or urging a cotton module within chamber 20 rearwardly, and operable in the opposite direction for moving or urging the module forwardly. Similarly, primary door segment 36 includes at least one cotton driver 82 and secondary door segment 44 includes at least one cotton driver 84, cotton drivers 82 and 84 each also preferably comprising a forwardly and rearwardly operable drag chain. Cotton drivers 80, 82, and 84 are preferably independently operable using conventional hydraulic motors, electric motors, or by connection to an engine of machine 10 or other motive source in any suitable manner. It should be noted that driver 80 in floor 20 and driver 82 in primary door segment 36 can as an option share a common drive shaft or be connected in driving relation one relative to the other by a transfer shaft, chain or the like, as long as the common drive shaft is inline with the primary door pivot 40 and drivers 80 and 82 are offset from one another, or other suitable provisions are made to allow for the pivotal movement of door segment 36. This would facilitate using one conventional drive for both drivers 80 and 82.

Figure 3:
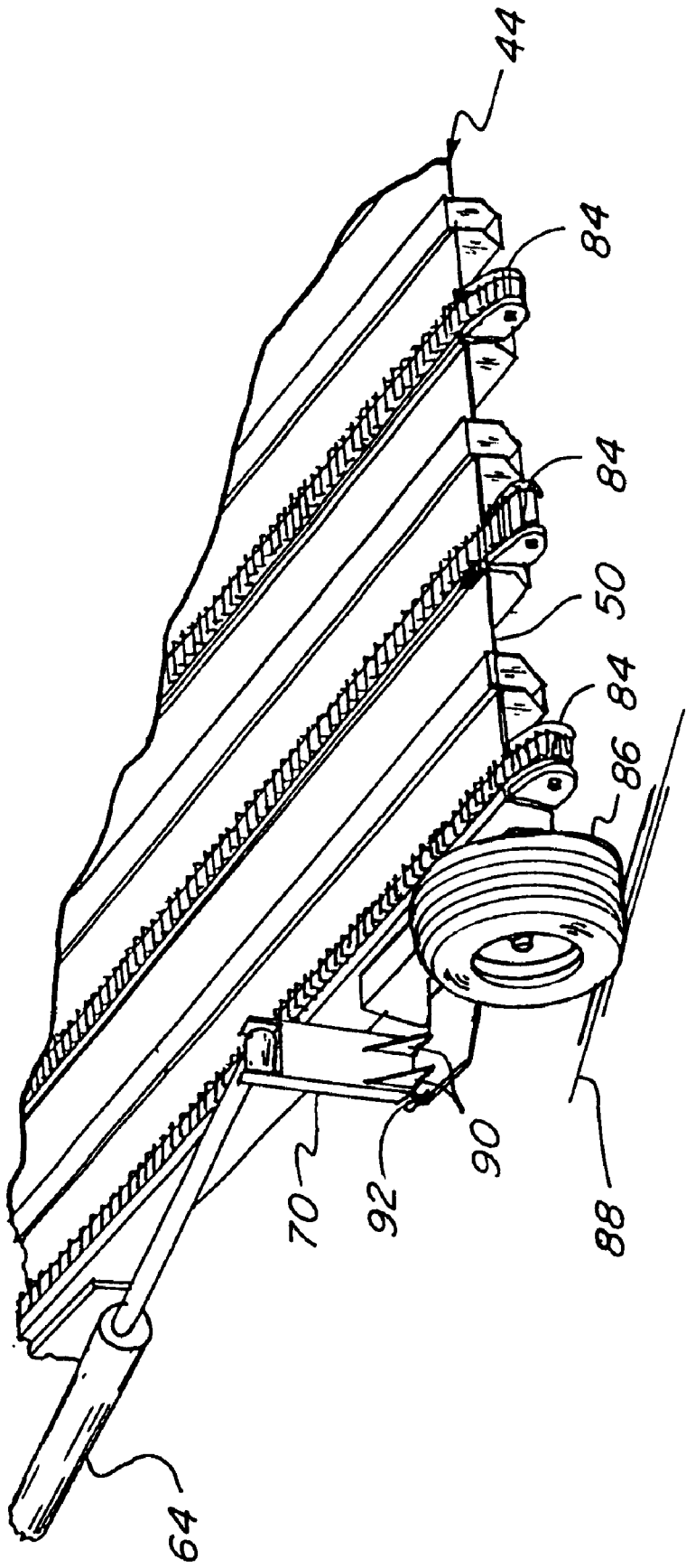
FIG. 3 is a fragmentary perspective view of a secondary door segment of the invention.

Referring to FIG. 3, secondary door segment 44 is shown, including a plurality of spaced cotton drivers 84, which is representative also of cotton drivers 80 and 82. In this regard, it should be noted that other drivers, such as belts, caterpillars, rollers, and the like may be used as any of drivers 80, 82, and 84. It should also be noted that FIG. 3 shows a wheel 86 mounted to free end 50, for facilitating easy forward and rearward movement of secondary door segment 44 over a surface 88 such as the ground, as the door segment is being unfolded and folded, and also as a cotton module is being unloaded from or loaded into cotton module builder 12, and, likewise, that other elements, such as skids, slides, rollers, or the like, could be used to facilitate movement of free end 50 over the ground or another surface 88, as desired. Still further in reference to FIG. 3, it should be noted that pivot stops 90 are provided on secondary door segment 44 for preventing link element 70 from being pivoted by cylinder 64 in the rearward direction beyond the outwardly extending position shown, and similarly, a stop 92 is provided for preventing pivotal movement of the link element in the opposite direction past about parallel to door segment 44, stops 90 and 92 being provided to achieve desired operation of link elements 70 as will be explained.

Figure 6:
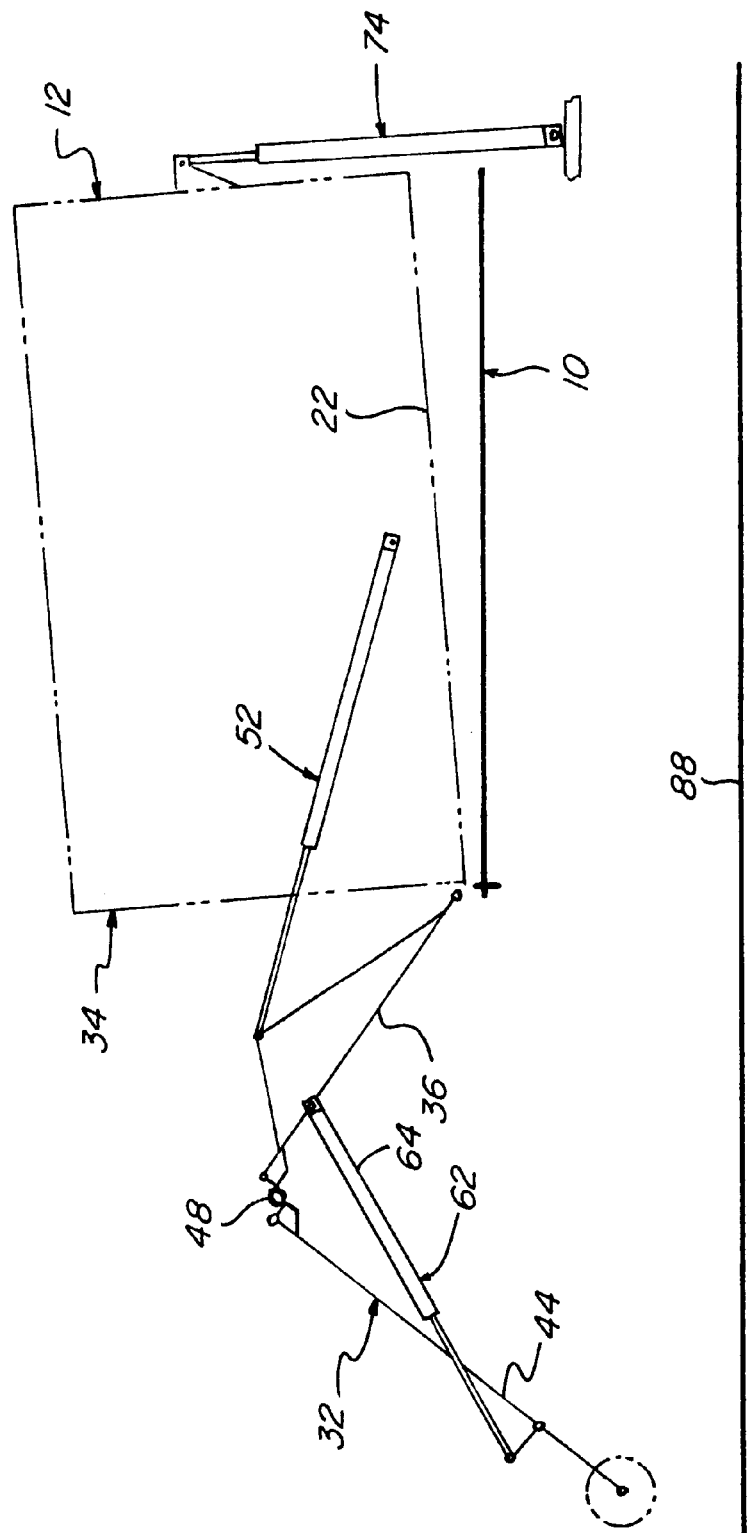
FIG. 6 is a simplified schematic representation showing further unfolding of the door.

Turning to FIGS. 4–8, steps will be described for the unfolding of folding door arrangement 32 from the folded position in closing relation to rear end 34 of cotton module builder 12 to an unfolded or unloading position inclined at an angle less than about 25° to a surface 88 lower than module builder 12 by an amount denoted by distance A in FIG. 4 equal to at least about 4 feet. Here, it should be noted that FIGS. 4–12 depict the right hand side of machine 10, module builder 12, and door arrangement 32, which is opposite of the left hand side shown in FIGS. 1 and 2. In FIG. 4, module builder 12 is shown in its normal operational or module building position on machine 10 with floor 22 generally parallel to surface 88. With module builder 12 in its operational position and folding door arrangement 32 in its folded or closed position, fluid cylinders 54 of primary door drivers 52, fluid cylinders 64 of secondary door drivers 62, and tilt drivers 74 are each retracted, and link elements 70 are positioned-substantially perpendicular to secondary door segment 44. As shown in FIG. 5, as pressurized fluid is delivered to cylinders 54 and 64 of drivers 52 and 62, and to tilt drivers 74, primary door segment 36 is pivoted about pivot 40 and secondary door segment 44 is pivoted about pivot 48 so as to extend away from rear end 34, while module builder 12 is pivoted about pivot 76 to incline floor 22, link element 70 remaining about perpendicular to secondary door segment 44. Referring to FIG. 6, as further fluid is delivered to drivers 52, 62 and 74, door arrangement 32 continues to unfold away from open end 34 and module builder 12 continues to tilt to further incline floor 22 relative to surface 88. Here, it should be observed that if drivers 52, 62 and 74 are jointly supplied the pressurized fluid from the same fluid circuit, the fluid will extend the fluid cylinders of the driver or drivers opposed by the least resistance first, which in this case, will be cylinders 64 of drivers 62, as gravity will be acting on door segments 36 and 44 to urge them downwardly, whereas the weight of module builder 12 and any cotton therein will act in opposition to the extension of drivers 74 because they are acting in an upward direction against that weight.

Figure 7:
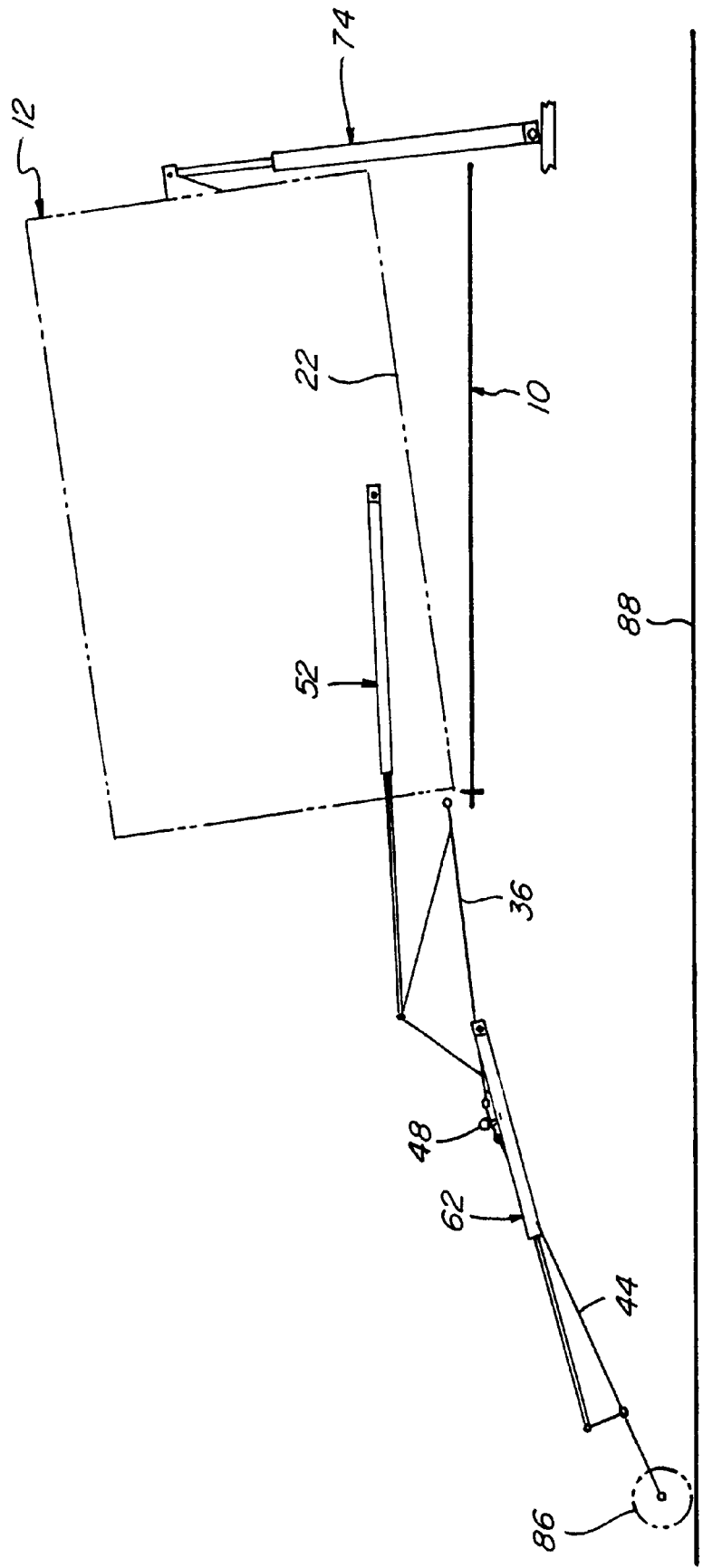
FIG. 7 is a simplified schematic representation showing the door further unfolded and the module builder further tilted.

In FIG. 7, drivers 52 and 62 are substantially fully extended and wheel 86 is in contact with surface 88. Drivers 74 are still only partially extended. In this position, floor 22 is thus not yet in its final incline position, but is substantially parallel to primary door segment 36, due to the complete extension of drivers 52. Door segments 36 and 44 are also not yet sufficiently parallel about pivot 48 for safely unloading or loading a cotton module.

Figure 8:
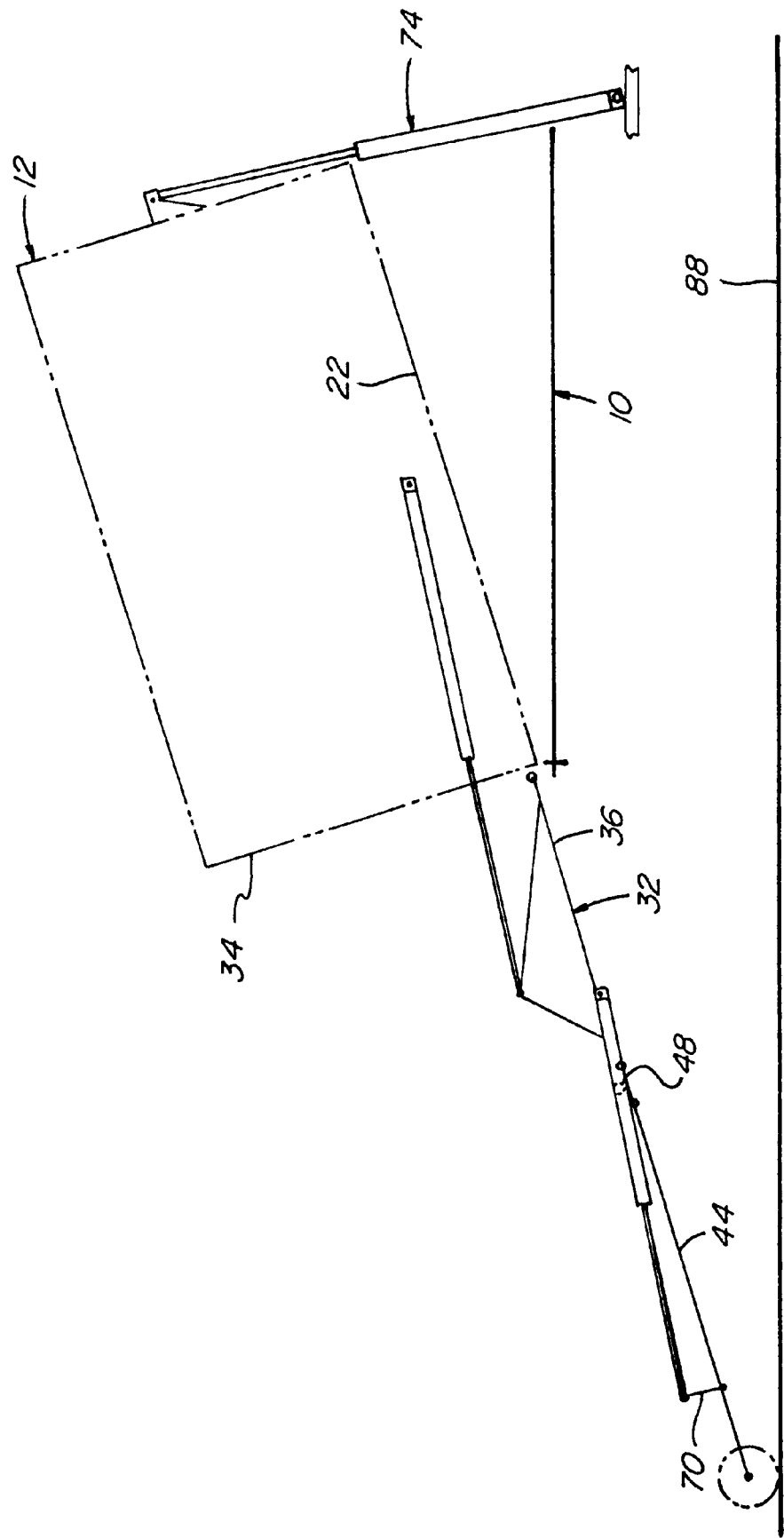
FIG. 8 is a simplified schematic representation showing the door in a completely unfolded position and the module builder in a completely tilted position.

Referring to FIG. 8, further delivery of pressurized fluid to drivers 74 subsequently causes them to reach their full extension such that floor 22 is now at the desired unloading incline to surface 88 and door segment 36 is brought into parallel alignment with door segment 44. During this step, link elements 70 will likely pivot by some amount to allow the pivotal movement of door segment 36 relative to door segment 44 and passage of cylinders 64 over pivot 48 without binding. Floor 22 and door segments 36 and 44 of door arrangement 32 now form a substantially continuous, planar surface at the desired incline relative to surface 88 for unloading or loading a cotton module, such as cotton module 30 shown in FIG. 2. Referring also to FIGS. 1 and 2, to facilitate unloading a module, one or both side walls 26 of module builder 12 can be released to reduce forces acting to retain the module or effectively enlarge chamber 20. Operation of cotton drivers 80, 82, and 84 will then be initiated in the rearward direction. When the module has passed sufficiently over door arrangement 32 such that the rearward lower edge of the module reaches the surface onto which it is to be unloaded, as shown in FIG. 2, movement of machine 10 in the forward direction is initiated, at a speed preferably closely corresponding to the rearward speed of the module, such that loads are not applied against the module which could partially split or sever it or otherwise damage it.

For loading a module such as module 30 from a lower surface into module builder 12, machine 10 will be driven rearwardly so as to position free end 50 of secondary door segment 44 in contact with one end of the module and cotton drivers 80, 82, and 84 will be operated in the forward direction for dragging the module onto and along door arrangement 32 and into chamber 20.

Referring now to FIGS. 9–12, when it is desired to return module builder 12 to the normal operational position with floor 22 generally parallel to surface 88, fluid under pressure is delivered to fluid cylinders 54 and 64 of drivers 52 and 62, respectively, and fluid is allowed to exit therefrom, such that cylinders 62 and 64 commence retracting. At the same time, or later if desired, the pressurized fluid can be released from tilt drivers 74 and pressurized fluid delivered to the end thereof to cause retraction thereof. As a first movement, because door segment 44 is supported at least to some extent on surface 88, retraction of fluid cylinders 64 will pivot link elements 70 forwardly and downwardly about pivots 72 to the position at least substantially parallel to secondary door segment 44. This positions cylinders 64 beneath pivot 48 such that further retraction of cylinders 64 will result in pivotal movement of door segment 44 in the proper direction. Referring to FIG. 10, at about the same time that link elements 70 are pivoting to the position about parallel to door segment 44, the weight of module builder 12 in combination with the optional introduction of pressurized fluid into tilt drivers 74 will cause drivers 74 to begin to retract such that cotton module builder 12 is pivoted downwardly about pivot 76 and secondary door segment 44 is pivoted downwardly about pivot 48. Cylinders 54 of primary door drivers 52 will begin to retract such that primary door segment 36 is pivoted upward about pivot 40.

Referring to FIG. 11, once tilt drivers 74 are fully retracted such that floor 22 is generally parallel to surface 88, cylinders 64 of secondary door drivers 62 will continue to retract, such that secondary door segment 44 is pivoted about pivot 48 to a near vertical position, free end 50 being supported by wheels 86 and moving along surface 88 toward module builder 12. Cylinders 54 of primary door drivers 52 will continue to retract such that primary door segment 36 continues to pivoted upward toward rear end 34 about pivot 40.

Figure 12:
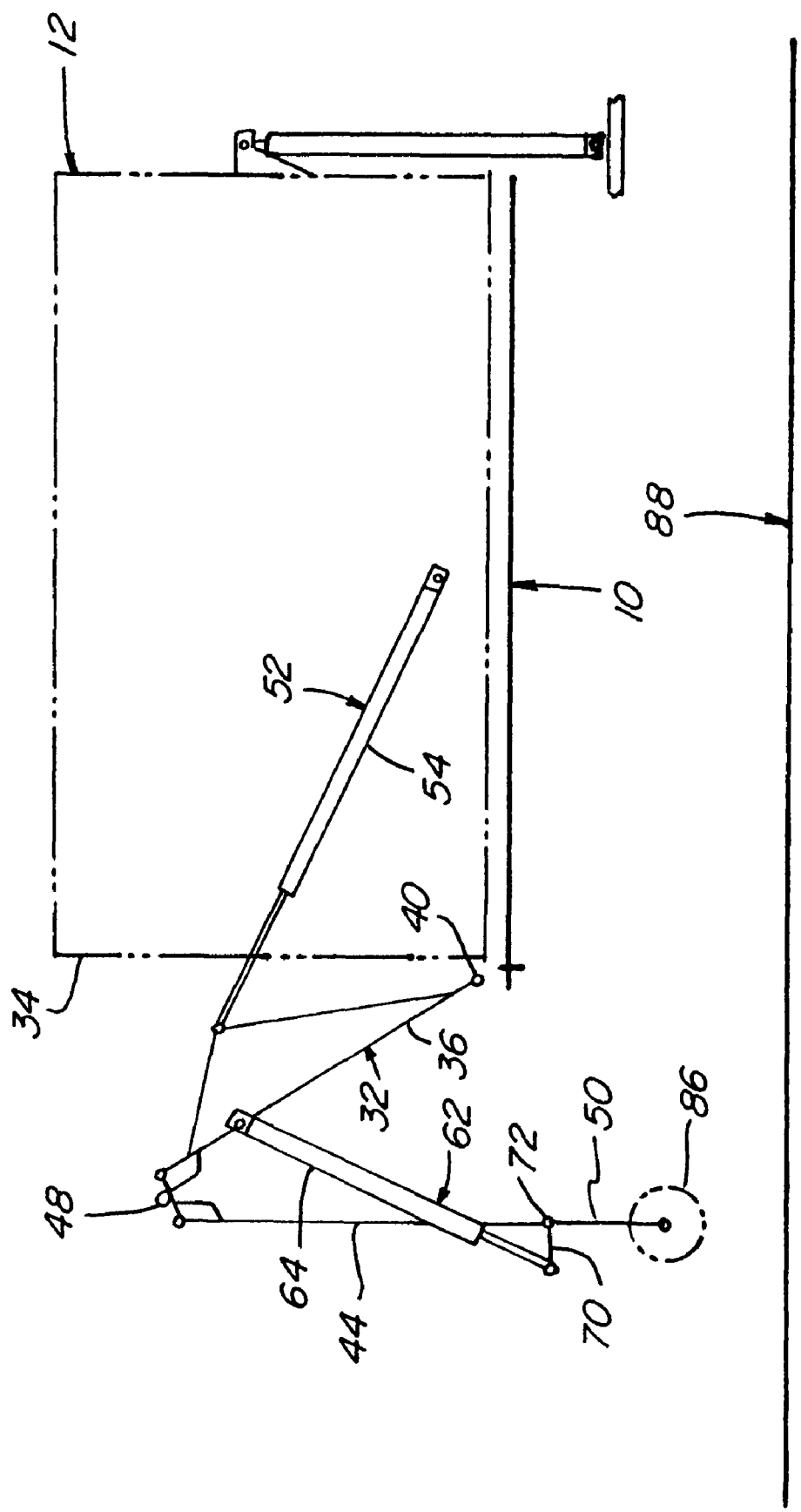
FIG. 12 is a simplified schematic representation showing still further folding of the door toward the folded position shown in FIGS. 1 and 4.

Referring to FIG. 12, fluid cylinders 54 of drivers 52 will continue to retract, pivoting primary door segment 36 upwardly about pivot 40 so as to lift secondary door segment 44 such that wheels 86 will break contact with surface 88 and no longer support free end 50. As a result, secondary door segment 44 will naturally pivot about pivot 48 to a generally vertical equilibrium position, importantly, this movement being allowed by the free pivoting of link elements 70 about pivots 72. Such free pivotal movement of link elements 70 about pivots 72 is important, as it has been found that when shifting or moving to the vertical position, due to the weight and length of secondary door segment 44, as noted above, a sideward load can be applied against fluid cylinders 64 sufficient to bend or otherwise damage them. Then, once secondary door segment 44 is substantially vertical, further retraction of cylinders 54 and 64 of drivers 52 and 62 will continue to pivot primary door segment 36 about pivot 40 and secondary door segment 44 about pivot 48 until both door segments are returned to the closed position, as shown in FIG. 4.

Figure 13:
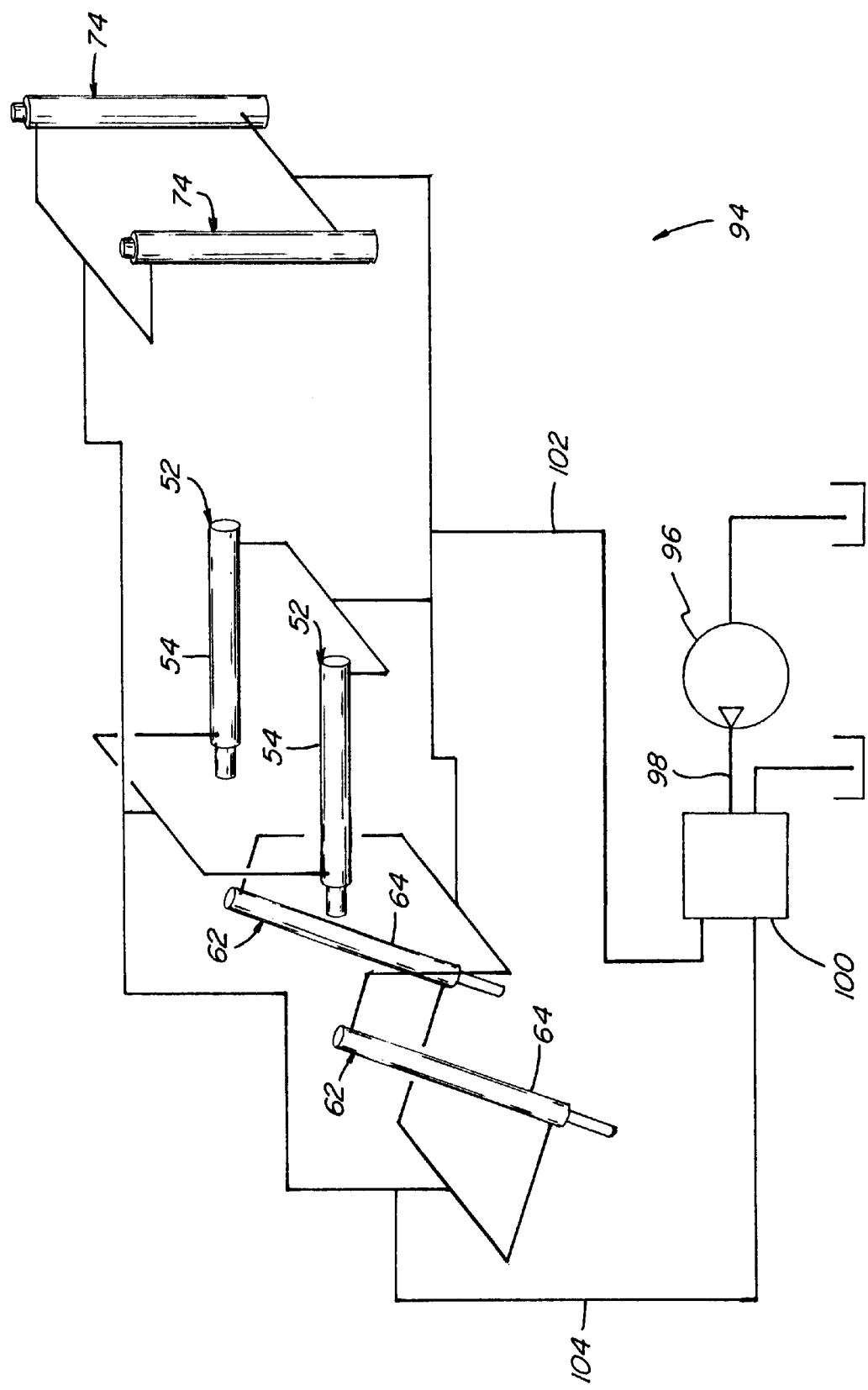
FIG. 13 is a simplified schematic representation of a fluid control system for the unfolding and folding of the door and the tilting of the module builder.

Turning to FIG. 13, an exemplary fluid control system 94 for effecting extension and retraction of fluid cylinders 54 and 64 of drivers 52 and 62, respectively, and tilt drivers 74, is shown. System 94 includes a conventional hydraulic pump 96 connected by a discharge line 98 to a fluid distribution valve 100, which in turn is connected to a first network 102 of fluid distribution lines connected to a first end of each of fluid cylinders 54 and 64 and tilt drivers 74, and to a second network 104 of fluid lines connected to an opposite end of fluid cylinders 54 and 64 and drivers 74, valve 100 being selectably operable in the conventional manner using solenoid controls or the like (not shown) by an operator for directing pressurized fluid from pump 96 into either network 102 or network 104, to effect the extension of cylinders 54 and 64 and drivers 74 for unfolding door 32 and tilting module builder 12, and to effect retraction of the cylinders and the drivers for folding door 32 and lowering module builder 12, as desired. Fluid restrictor orifices, pressure transducers, and the like (also not shown), can be used for controlling, adjusting, and/or effecting sequential operation of the drivers, cylinders, and other components as desired.

Figure 14:
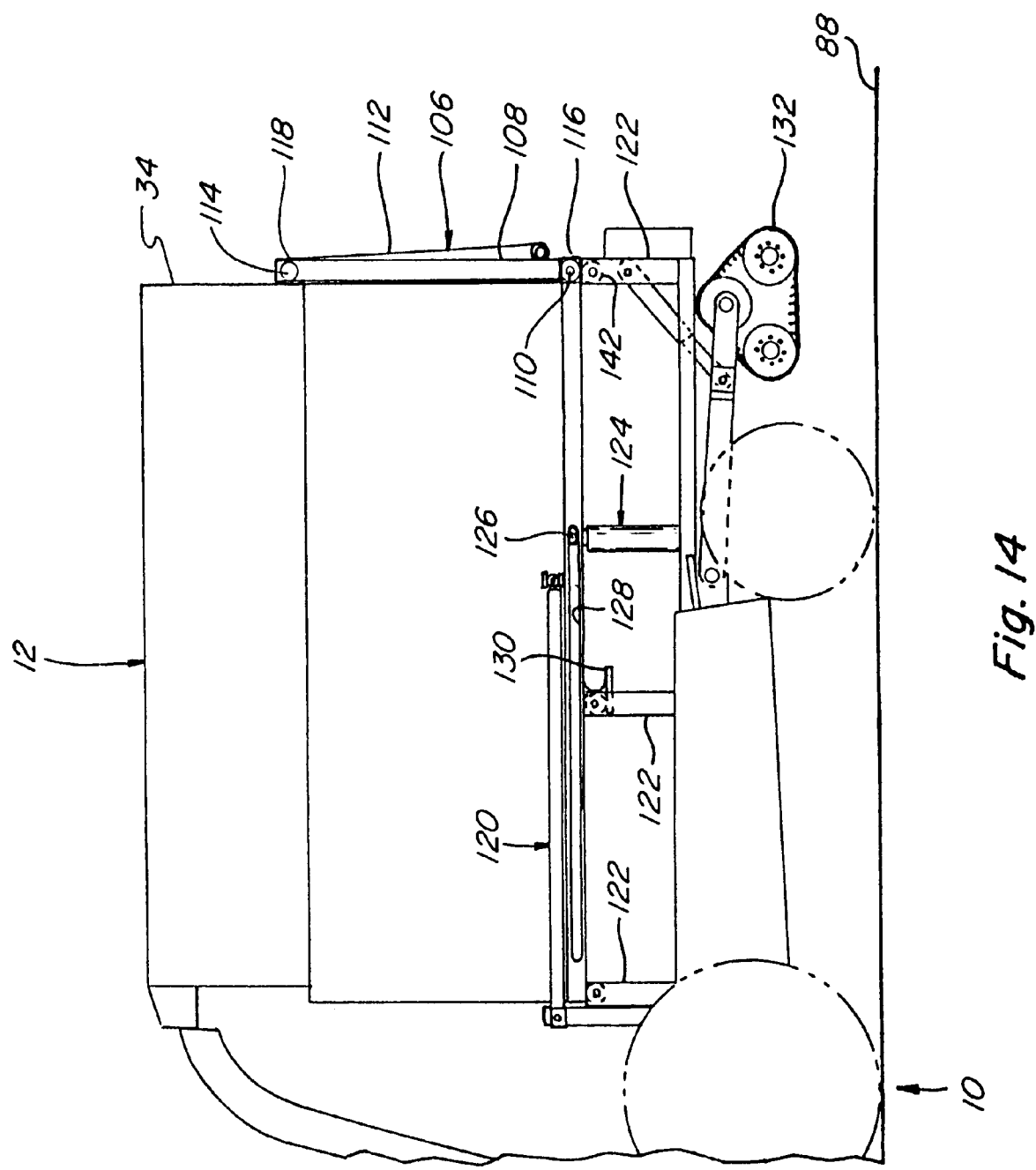
FIG. 14 is a simplified schematic representation of a cotton harvesting and module building machine including another folding door arrangement constructed and operable according to the present invention, shown in a folded position.
Figure 15:
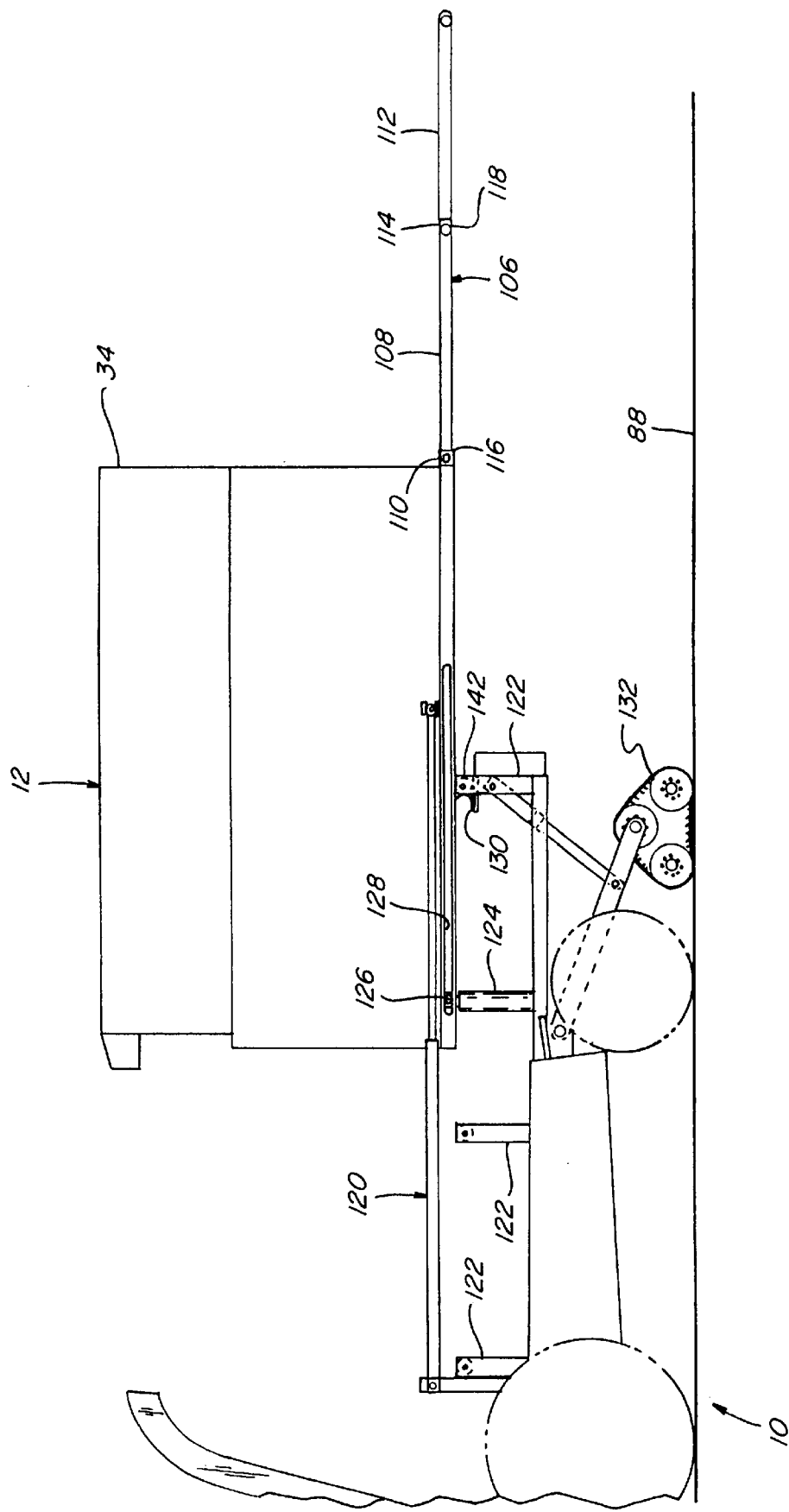
FIG. 15 is a simplified schematic representation of the machine of FIG. 14 showing the door in an unfolded position and a module builder of the machine moved to a rearward position.
Figure 16:
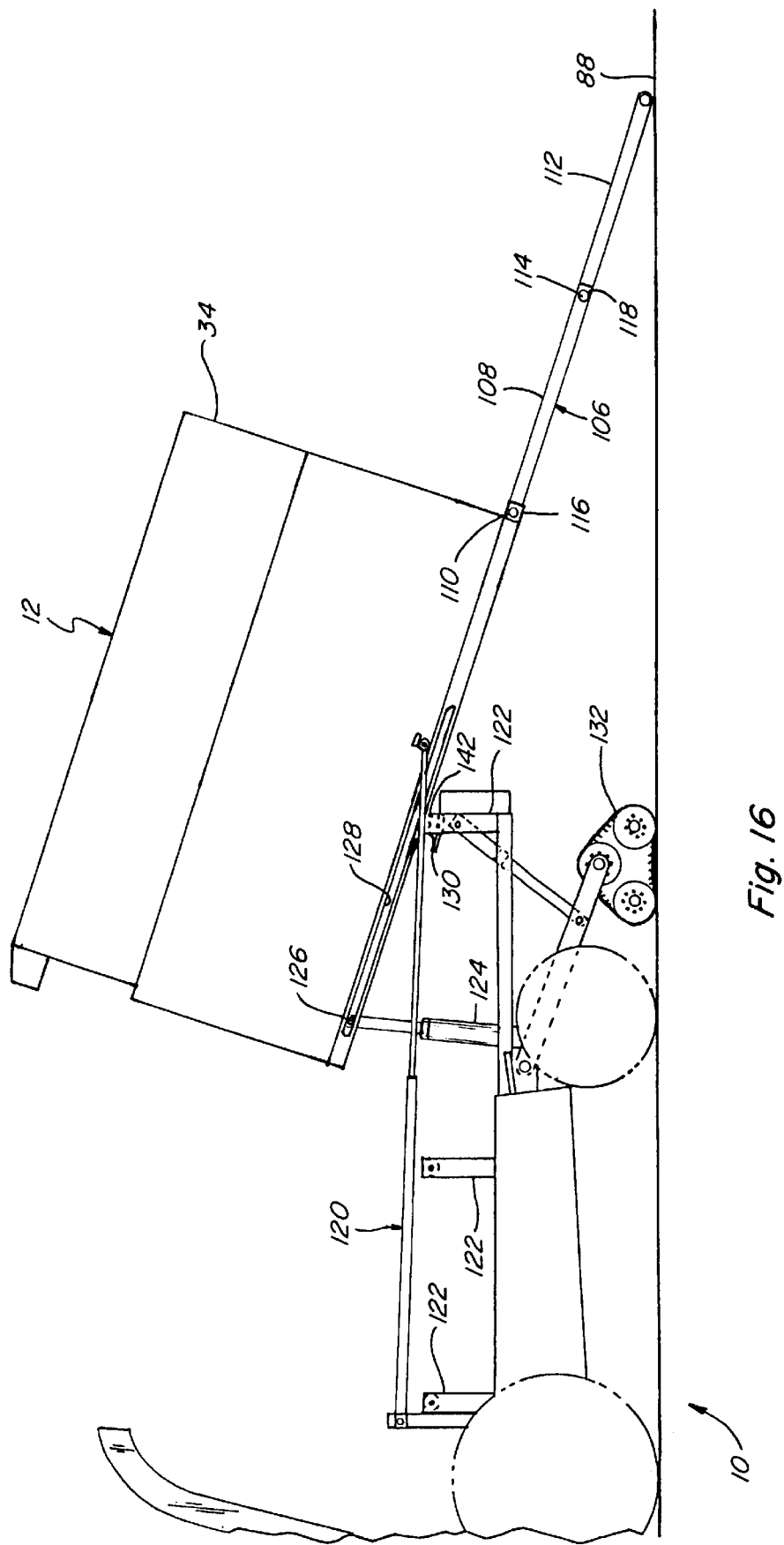
FIG. 16 is a simplified schematic representation of the machine of FIG. 14, showing the module builder and folding door tilted to an unloading position.

In FIGS. 14–16, machine 10 is shown including another folding door arrangement 106 constructed and operable according to the present invention for unloading cotton modules from, and loading modules into, module builder 12, like elements of door arrangement 106 and door arrangements 32 being identified by like numbers, and many elements of door arrangement 106 being similar to elements of door arrangement 32, the primary difference being that door arrangement 106 is shorter than door arrangement 32. Door arrangement 106 includes a primary door segment 108 pivotally mounted to rear end 34 of module builder 12 at pivot 110, and a secondary door segment 112 pivotally mounted to segment 108 at a pivot 114, door segments 108 and 112 including suitable cotton drivers such as drivers 82, 84 (not shown) as required for moving cotton modules such as module 30 thereover. However, instead of primary and secondary door drivers 52 and 62 which utilize fluid cylinders, door arrangement 106 is shown including a primary door driver 116 and a secondary door driver 118 which are each hydraulic gear motors, operable for pivotally moving door segments 108 and 112 between the folded or closed position shown in FIG. 14, and the unfolded or unloading position shown in FIGS. 15 and 16.

In FIGS. 14–16, a different apparatus is also shown for tilting module builder 12, including one or more at least generally horizontally oriented drivers 120 which are fluid cylinders operable for effecting sliding or rolling movement of module builder 12 along a support structure including a horizontal bed of upstanding stays 122 between a forwardly located operational or module building position (FIG. 14), and a rearwardly located tilt or unloading position (FIGS. 15 and 16). At the tilt or unloading position module builder 12 can be tilted about a horizontal arm or center of a roller 142 by a tilt driver 124 pivotally connected between module builder 12 and machine 10 to lower rear end 34 and door arrangement 106 while tilting module builder 12 to a desired incline of about 25° or less relative to a surface 88 onto which a module is to be unloaded or from which a module is to be loaded. An advantage of lowering rear end 34 and door arrangement 106 is that it brings pivot 110 closer to surface 88 which allows primary door segment 108 and secondary door segment 112 to be shorter and thus lighter than door segments 36 and 44 of the previous door arrangement 32. Tilt driver 124 can be connected to module builder 12 in any suitable manner to provide the required tiltability, driver 124 here including a pin 126 slidably received in a forward to rearward extending slot 128 along the bottom of module builder 12, the pin being drivable by driver 124 upwardly against a surface there above to lift the forward end of module builder 12 when positioned over driver 124. Module builder 12 additionally includes a stop 130 engageable with a stay 122 positioned about midway beneath module builder 12 when in the operational position, and engageable with a rearmost stay 122 when in the unloading position. When in the operational position stop 130 also prevents movement upward of module builder 12 as machine 10 is traveling over uneven terrain. When engaged with the rearmost stay 122 during unloading stop 130 prevents module builder 12 from sliding rearward off of machine 10. Machine 10 additionally includes a pair of optional drop down tracks 132 located beneath the rear end thereof and lowerable into a position in contact with surface 88 for providing additional support and stability for module builder 12 when in the rearward position shown in FIGS. 15 and 16. Drop down tracks 132 can be unpowered, or powered to provide motive assistance to machine 10 when unloading or loading a cotton module, as desired or required.

Figure 17:
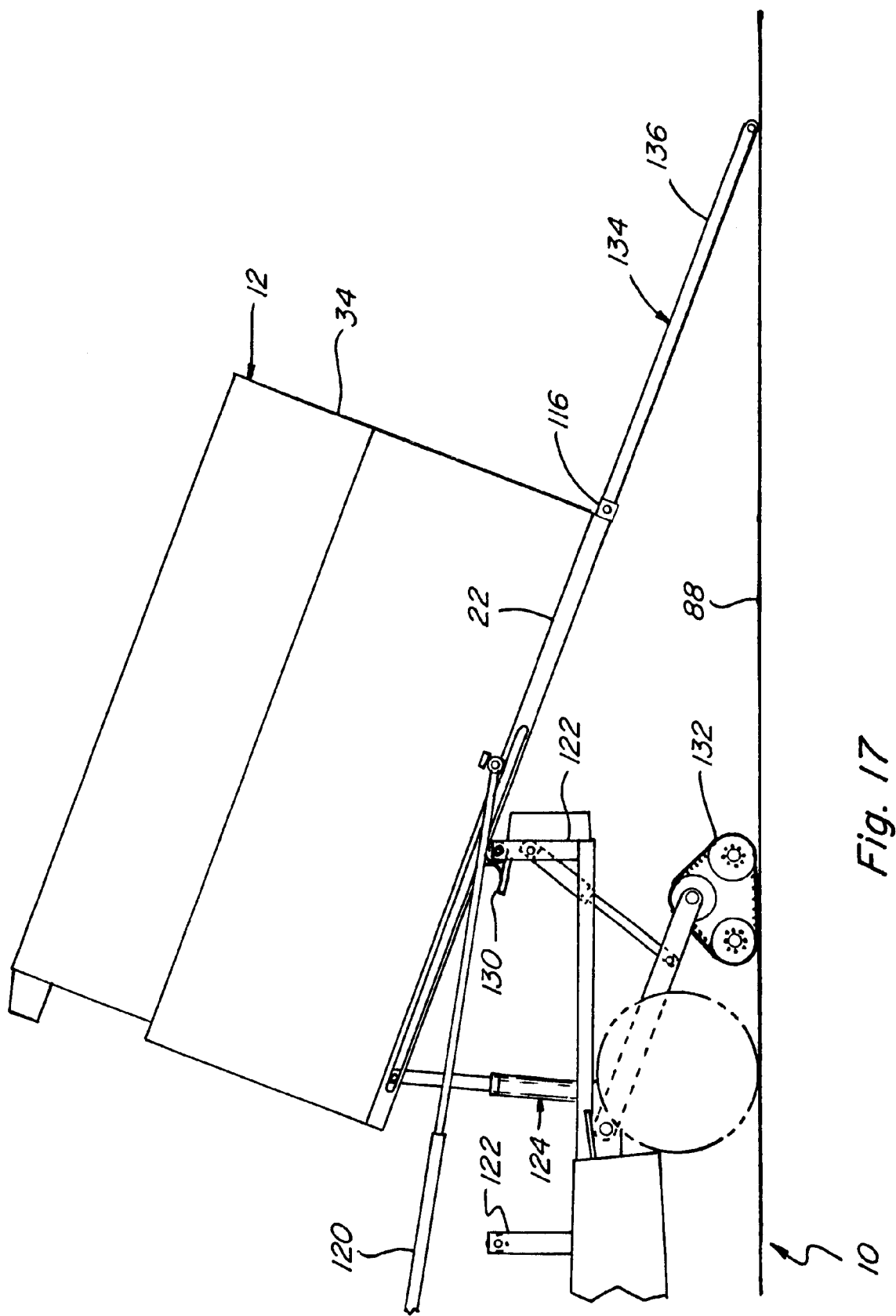
FIG. 17 is a simplified schematic representation of a cotton harvesting and module building machine including another folding door arrangement constructed and operable according to the present invention, shown tilted in an unloading position.

In FIG. 17 machine 10 is shown including another folding door arrangement 134 according to the present invention for unloading cotton modules from, and loading cotton modules into, module builder 12, like parts of door arrangement 134 and door arrangements 32 and 106 being identified by like numbers. Door arrangement 134 primarily differs from door arrangements 32 and 106 in the provision of a single door 136 pivotally mounted to rear end 34 of module builder 12 and pivotally movable between a folded or closed position (not shown) in closing relation to rear end 34 and an unfolded or unloading position at least substantially parallel to floor 22 of module builder 12. Also, instead of a door driver which utilize fluid cylinders, door arrangement 134 is shown including a door driver 116 which is a hydraulic gear motor operable for pivotally moving door 136 between the folded or closed position, and the unfolded or unloading position shown in FIG. 17. Machine 10 in FIG. 17 is shown including the same apparatus of FIGS. 14–16 for tilting module builder 12, including one or more generally horizontal drivers 120 which are fluid cylinders operable for effecting sliding or rolling movement of module builder 12 along support structure such as a horizontal bed of upstanding stays 122 between a forwardly located module building position (FIG. 14) and a rearwardly located tilt or unloading position (FIG. 17) where module builder 12 can be tilted by a tilt driver 124 pivotally connected between module builder 12 and machine 10 to lower open end 34 and door arrangement 134 and incline them to a desired incline of about 25° or less relative to a surface 88 onto which a module is to be unloaded or from which a module is to be loaded. Tilt driver 124 can be connected to module builder 12 in any suitable manner such as described above, and module builder 12 can include stops 130 engageable with a stay 122 positioned about midway beneath module builder 12 when in the operating position, and engageable with a rearmost stay 122 when in the unloading position. When in the operational position stop 130 prevents movement upward of module builder 12 as machine 10 is traveling over uneven terrain. When engaged with the rearmost stay 122 during unloading stop 130 prevents module builder 12 from sliding rearward off of machine 10. Machine 10 additionally is shown including a pair of optional drop down tracks 132, which can be powered or unpowered, located beneath the rear end thereof as described above.

Here, it should be noted that door arrangement 32 when in the unfolded or unloading position is oriented at about a 17° angle to a surface such as surface 88. Door arrangement 106 is oriented at about a 15° angle to the surface, and door arrangement 134 is at about a 20° angle to the surface. Each of these angles is within the approximately maximum 25° angle range known to be safe for unloading and loading cotton modules. It should also be noted that although door arrangements 106 and 134 include hydraulic gear motor drivers 116 and 118, other drivers such as fluid cylinder type drivers could be used, as desired.

Figure 18:
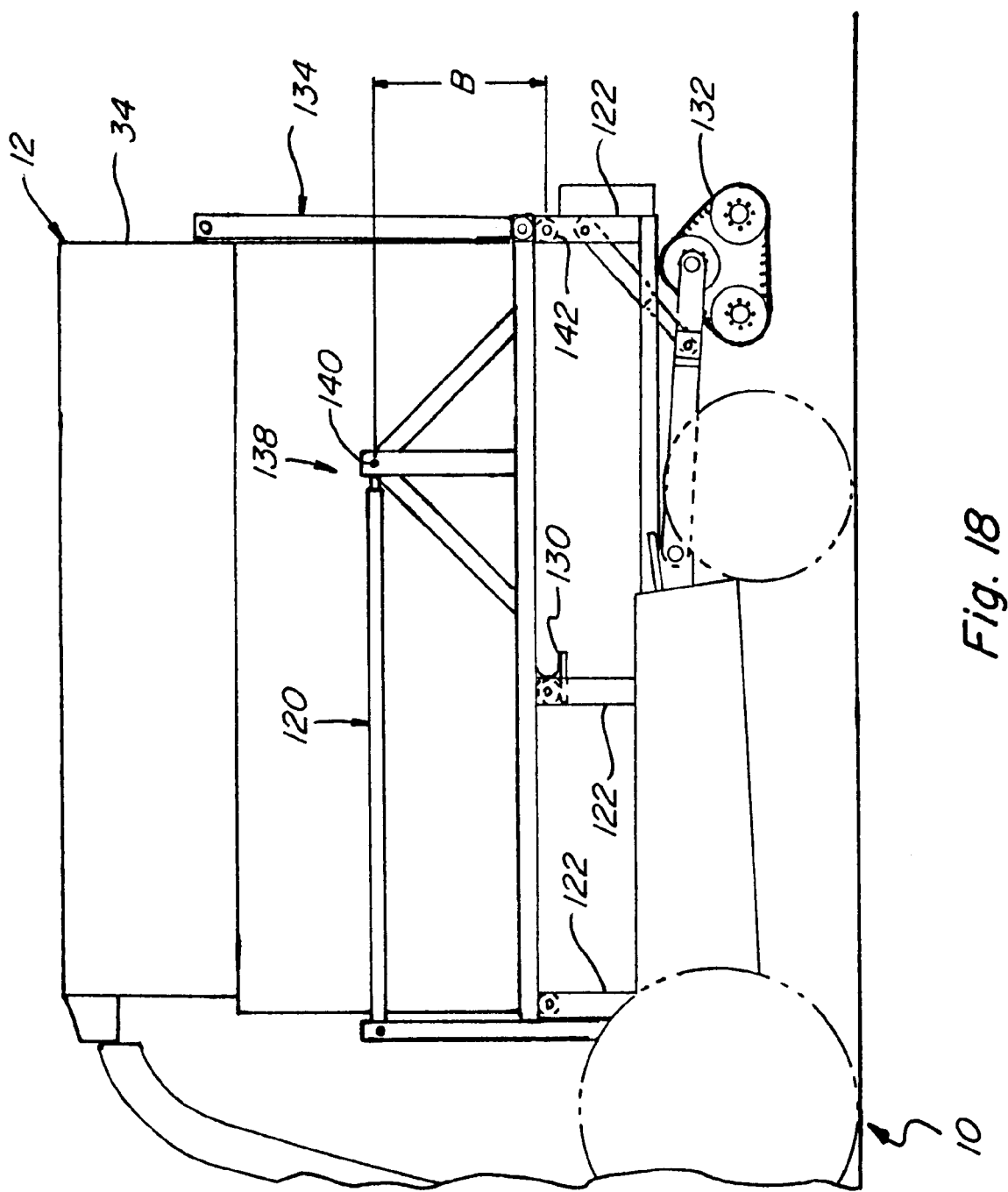
FIG. 18 is a simplified schematic representation of a cotton harvesting and module building machine including an alternative apparatus for tilting the module builder, shown in an operational position.
Figure 19:
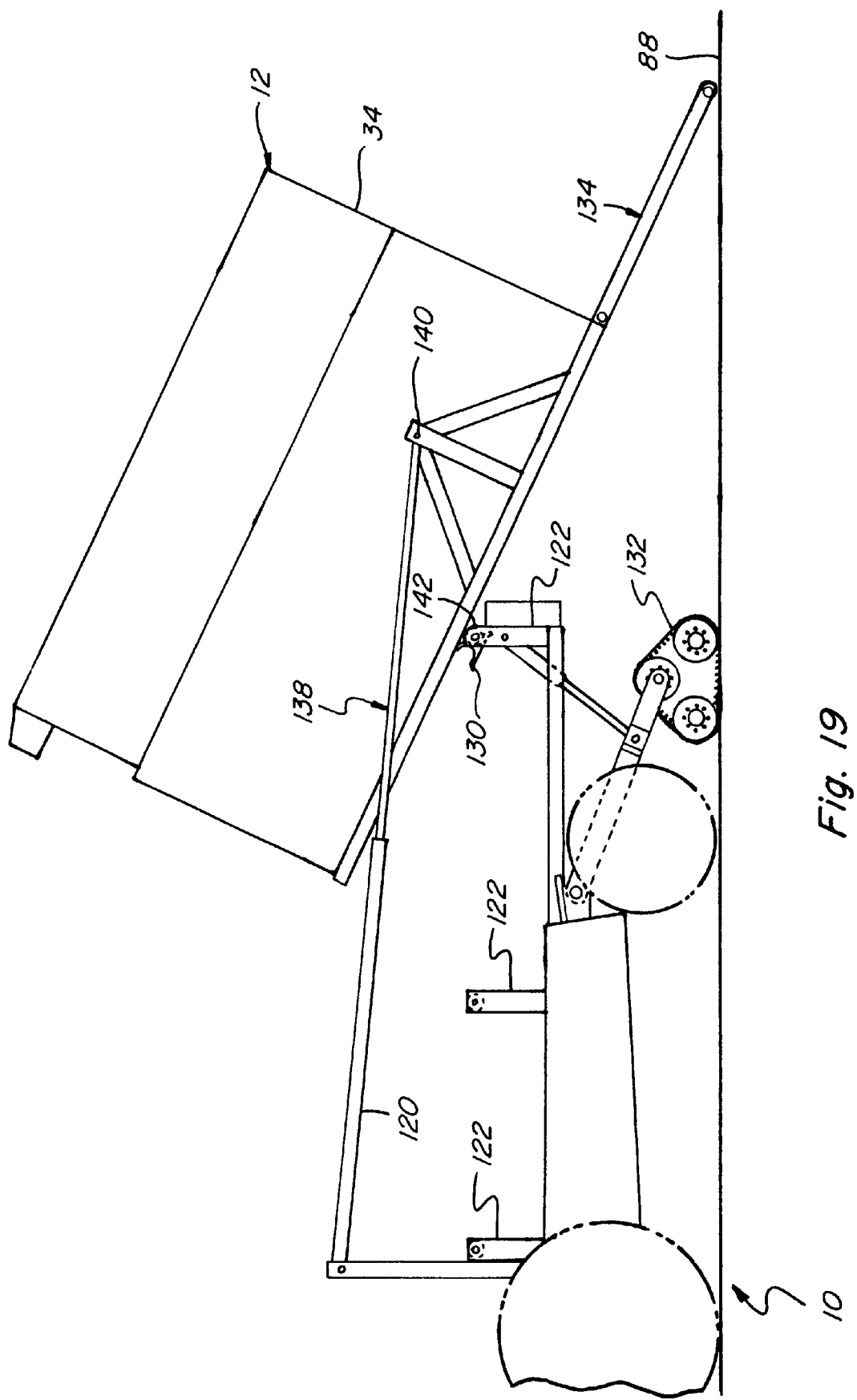
FIG. 19 is a simplified schematic representation of the cotton harvesting and module building machine including the apparatus of FIG. 18, shown in a tilted position.
Figure 20:
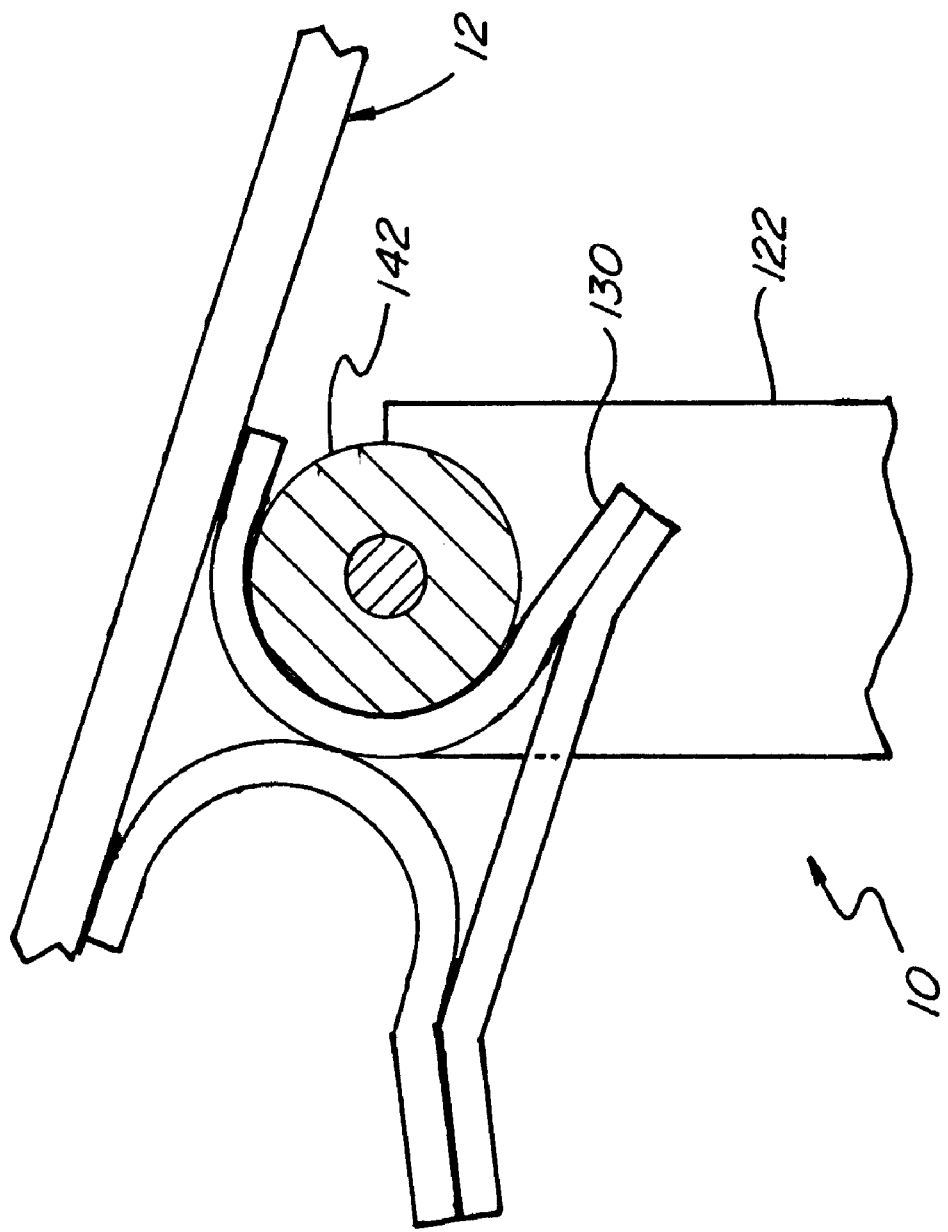
FIG. 20 is a simplified enlarged side view of a stop of the apparatus of FIGS. 18 and 19.

In FIGS. 18–20, machine 10 is shown including apparatus 138 according to the present invention for tilting module builder 12 and lowering rear end 34 thereof, such that a shorter folding door arrangement, such as, but not limited to, a shorter door arrangement 134 shown, can be used, and tilt driver 124, pin 126, and slot 128 (shown previously), can be eliminated. As shown in FIGS. 18 and 19, apparatus 138 includes one or more generally horizontally oriented drivers 120, which are fluid cylinders operable for effecting sliding or rolling movement of module builder 12 along a horizontal bed of upstanding stays 122 or other support structure, driver or drivers 120 being pivotally connected to machine 10 and to module builder 12 at suitable locations, such as, but not limited to, a location 140 shown a distance B above the center of a horizontal roller 142 on rearmost stay 122 when module builder 12 is in the operational position, such that a moment is advantageously created between location 140 and a horizontal axis of roller 142 to facilitate extending and retracting of driver or drivers 120 for controllably pivoting module builder 12 about roller 142 between a generally horizontal position and a tilted or unloading position such as that shown in FIG. 19. As before, a stop 130 on module builder 12 is cooperatively engageable with a middle stay 122 to prevent tilting of module builder 12 when in the operational position (FIG. 18), and engageable with roller 142 of rearmost stay 122 to prevent rearward movement of module builder 12 off of machine 10 and to position module builder 12 for tilting to the unloading position, as shown in FIGS. 19 and 20. In operation, as driver or drivers 120 are extended for moving module builder 12 rearwardly, stop 130 will engage roller 142 before the driver or drivers fully extend, such that further extension will controllably pivot module builder 12 about roller 142 to the desired tilted or unloading position, as exemplified in FIG. 19. The amount or degree of tilt is determined by the amount of further extension of driver or drivers 120 when stop 130 is engaged with roller 142. As noted above, due to the lowering of rear end 34 in the unloaded position, a shorter door arrangement can be used, such as door arrangement 134 shown and operable in the above discussed manner. Here, it should be noted that module builder 12 is shown in FIG. 19 tilted to an angle of about 25° relative to surface 88, which exemplifies about the maximum safe angle of inclination with reduced risk of damaging a module as it moves from door arrangement 134 to surface 88. Machine 10 again is shown including a pair of optional powered or unpowered drop down tracks 132 located beneath the rear end thereof as described above.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates several preferred embodiments of the invention and methods of operation of the same; however, concepts, as based upon the description, may be employed in other embodiments without departing from the scope of the invention. Accordingly, the following claims are intended to protect the invention broadly as well as in the specific form shown.

What is claimed is:

1. A folding door arrangement for a mobile cotton harvester including an onboard cotton module builder, the cotton module builder including a cotton compacting structure including a cotton compacting chamber having an open end, and a floor located in the chamber, at least the floor being tiltable so as to be oriented downwardly toward the open end and so as to be oriented at a predetermined incline relative to a surface lower than the module builder for unloading cotton from the chamber onto the surface, the folding door arrangement comprising:

a primary door segment mounted to the cotton module builder for pivotal movement between a closed position in at least partially closing relation to the open end and an open position at least substantially parallel to the floor;

a secondary door segment pivotally mounted to the primary door segment;

a primary door driver arrangement connected between the cotton module builder and the primary door segment operable for pivotally moving the primary door segment between the closed position and the open position; and a secondary door driver arrangement connected between the primary door segment and the secondary door segment operable for pivotally moving the secondary door segment between a generally upstanding folded position generally parallel to and beside the primary door segment and an unfolded position oriented at the predetermined incline relative to the surface lower than the module builder and in contact with the surface, the secondary door driver arrangement including at least one fluid cylinder pivotally connected between the primary door segment and a link element pivotally connected to the secondary door segment, the fluid cylinder being extendable for pivotally moving the secondary door segment from the folded position to the unfolded position, and the link element being pivotable through a predetermined range of pivotal positions when the fluid cylinder is extended and the secondary door segment is in the unfolded position for allowing the primary door segment and the floor to be pivoted relative to the secondary door segment into at least generally coplanar alignment therewith at the predetermined incline relative to the surface so as to provide a straight inclined path for unloading cotton from the chamber onto the surface.

2. The folding door arrangement of claim 1, wherein the at least one fluid cylinder is retractable for pivotally folding the secondary door segment relative to the primary door segment from the unfolded position to a partially folded position between the unfolded and folded positions, and the link element is pivotable relative to the fluid cylinder through a predetermined range of pivotal positions when the secondary door segment is in the partially folded position for allowing the secondary door segment to be pivoted by gravity to the folded position.

3. The folding door arrangement of claim 1, wherein the primary door driver comprises at least one fluid cylinder extendable for pivotally moving the primary door segment from the closed position to the open position, and the folding door arrangement further comprises at least one fluid cylinder extendable for tilting the cotton module for orienting the floor at the predetermined incline, all of the fluid cylinders being connected to a common source of fluid under pressure such that as the fluid under pressure is delivered to the fluid cylinders when retracted the secondary door segment will be unfolded to the partially unfolded position generally as the primary door segment is pivotally moved to the open position and thereafter the cotton module builder will be tilted to orient the floor and the primary door segment at the predetermined incline.

4. The folding door arrangement of claim 1 wherein the secondary door segment has a proximal end and an opposite free end, the proximal end being pivotally connected to the primary door segment and the link element being pivotally connected to the secondary door segment adjacent to the free end.

5. The folding door arrangement of claim 1 wherein the predetermined incline comprises an angle of between about 10 and about 25 degrees relative to the surface.

6. The folding door arrangement of claim 1 comprising cotton drivers on the primary and secondary door segments operable for moving cotton thereover when in the unfolded position between the primary door segment and the surface lower than the module builder, the cotton drivers being operable in a first direction for unloading cotton from the module builder onto the surface and operable in a second direction for loading cotton from the surface into the module builder.

7. The folding door arrangement of claim 6 wherein the cotton driver comprises a drag chain.

8. The folding door arrangement of claim 1 wherein the primary door driver comprises a hydraulic motor.

9. A self-propelled cotton harvesting machine, comprising:

at least one harvesting unit for harvesting cotton from cotton plants as the machine is moved in a forward direction over the ground;

compacting structure including walls and a floor defining a cotton compacting chamber for receiving the harvested cotton and a compactor operable for compacting the cotton received in the chamber to form a unitary compacted cotton module within the chamber;

at least one conveyor element for conveying the harvested cotton from the at least one harvesting unit into the cotton compacting chamber; and apparatus for unloading the compacted cotton module from the cotton compacting chamber onto a surface lower than the compacting chamber, including a door element mounted for movement between a generally upstanding closed position in at least partially covering relation to an open end of the compacting chamber and an open position at least generally coplanar with the floor, at least one driver operable for tilting the door element and at least the floor of the compacting structure to an incline at an angle with respect to horizontal of between about 10 and about 25 degrees while positioning an end of the door element opposite the compacting structure in contact with or adjacent to the surface lower than the compacting chamber, and at least one cotton driver operable for moving the cotton module over the floor and the door element and into contact with the surface lower than the compacting chamber, wherein the door element includes at least a first door segment pivotally connected to the cotton harvesting machine for pivotal movement between the open and closed positions and a second door segment including the edge opposite the compacting structure, the second door segment being pivotally mounted to the first door segment for pivotal movement relative thereto between a folded position generally beside the first door segment and an unfolded position at least generally coplanar therewith, and at least one driver connected between the first door segment and the second door segment and operable for pivotally moving the second door segment relative to the first door segment between the folded position and the unfolded position and including at least one fluid cylinder having one end pivotally connected to the first door segment and an opposite end pivotally connected to a link element pivotally connected to the second door segment, the fluid cylinder being extendable for pivotally moving the second door segment from the folded position to the unfolded position, and the link element being pivotable through a predetermined range of pivotal positions when the fluid cylinder is extended and the second door segment is in the unfolded position for allowing the first door segment and the floor to be pivoted relative to the second door segment into at least generally coplanar alignment therewith at the incline relative to the ground so as to provide a straight inclined path for unloading the compacted cotton module from the chamber onto the ground.

10. The self-propelled cotton harvesting machine of claim 9 wherein at least one of the walls of the cotton compacting structure is movable in a direction away from a compacted cotton module in the cotton compacting chamber for reducing any forces opposing the movement of the cotton module over the floor of the chamber.

11. The self-propelled cotton harvesting machine of claim 9, wherein the at least one fluid cylinder is retractable for pivotally folding the second door segment relative to the first door segment from the unfolded position to a partially folded position between the unfolded and folded positions, and the link element is pivotable relative to the fluid cylinder through a predetermined range of pivotal positions when the second door segment is in the partially folded position for allowing the second door segment to be pivoted by gravity to the folded position.

12. The self-propelled cotton harvesting machine of claim 9 wherein the at least one cotton driver is selectively operable in a reverse direction for moving a cotton module from a surface lower than the compacting chamber over the door element and the floor into the compacting structure.

13. The self-propelled cotton harvesting machine of claim 9, further comprising at least one driver operable for positioning at least the door element and an end of the floor adjacent thereto at a lowered position when tilted so as to be closer to the surface lower than the compacting chamber compared to when not tilted.

14. The self propelled cotton harvesting machine of claim 13, wherein the at least one driver operable for positioning at least the door element and the end of the floor adjacent thereto at the lowered position comprises at least one fluid cylinder operable for moving at least the floor and the door element generally horizontally over a support structure of the machine from an operational position to a tilt position at which the door element and the end of the floor adjacent thereto will be lower than an opposite end of the floor when the floor and the door element are tilted to the incline.

15. The self propelled cotton harvesting machine of claim 14, wherein the at least one driver operable for positioning at least the door element and the end of the floor adjacent thereto at the lowered position comprises at least one second fluid cylinder operable for pivoting at least the floor and the door element when at the tilt position about a predetermined generally horizontal axis in a direction to lower the door element and the end of the floor adjacent thereto.

16. A method of operation of mobile cotton module builder, comprising the steps of:
providing a cotton compacting structure on the module builder including a cotton compacting chamber having an open end, and a floor located in the chamber, the cotton compacting structure being tiltable between an operational position wherein the floor is generally level and an unloading position wherein the floor is tilted downwardly toward the open end for unloading cotton from the chamber:
providing a primary door segment having a first end and an opposite second end, the first end being pivotally connected to the cotton module builder for allowing relative pivotal movement between the primary door segment and the cotton module builder for positioning the primary door segment in a first position in at least partial closing relation to the open end and a second position substantially parallel to the floor;
providing at least one primary door driver connected between the primary door segment and the cotton module builder operable for relatively pivotally moving the primary door segment and the cotton module builder;
providing a secondary door segment having a proximal end and an opposite free end, the proximal end being pivotally connected to the second end of the primary door segment for allowing relative pivotal movement of the primary and secondary door segments for positioning the secondary door segment in a generally upstanding orientation in a folded position beside the primary door segment and an unfolded position angularly related to the folded position and substantially coplanar with the primary door segment;
providing at least one secondary door driver connected between the primary door segment and the secondary door segment for moving the secondary door segment between the folded and unfolded positions, the secondary door driver including a fluid cylinder having a first end pivotally connected to the primary door segment and a second end pivotally connected to a link element pivotally connected to the secondary door segment and freely pivotable within a predetermined range of pivotal movement;
extending the fluid cylinder for pivotally moving the secondary door from the folded position partially toward the unfolded position such that the free end is lowered into at least close proximity to a surface onto which a cotton module located in the cotton module builder is to be unloaded;
operating the primary door driver for relatively pivoting the primary door segment and the module builder; and tilting the cotton module builder, such that the primary door segment is brought into the second position while oriented in at least substantially parallel relation to the secondary door segment.

17. A self-propelled cotton harvesting machine, comprising: at least one harvesting unit for harvesting cotton from cotton plants as the machine is moved in the forward direction over the ground;

compacting structure including walls and a floor defining a cotton compacting chamber for receiving the harvested cotton and a compactor operable for compacting the cotton received in the chamber to form a unitary compacted cotton module within the chamber;

at least one conveyor element for conveying the harvested cotton from the at least one harvesting unit into the cotton compacting chamber; and apparatus for unloading the compacted cotton module from the cotton compacting chamber onto a surface lower than the compacting chamber, including a door element mounted to the compacting structure for movement between a generally upstanding closed position in at least partially covering relation to an open end of the compacting chamber and an open position at least generally coplanar with the floor, at least one driver operable for moving the door element between the closed position and the open position, structure for supporting the compacting structure including the walls, the floor and the compactor and the door element for forward and rearward movement on the harvesting machine between a forwardly located operational position and a rearwardly located unloading position, at least one driver operable for moving the compacting structure and the door element between the operational position and the unloading position and for tilting the compacting structure and the door element to an incline at an acute angle with respect to horizontal while lowering the rear end of the compacting structure and the door element and positioning an end of the door element opposite the compacting structure in contact with or adjacent to the surface lower than the compacting chamber, and at least one cotton driver operable for moving the cotton module over the floor and the door element and into contact with the surface lower than the compacting chamber for unloading the cotton module therefrom.

18. The self-propelled cotton harvesting machine of claim 17, wherein the at least one driver operable for moving the compacting structure and the door element between the operational position and the unloading position and tilting the compacting structure and the door element comprises a fluid cylinder extendible by a first amount for moving the compacting structure and the door element rearwardly from the operational position to the unloading position, the fluid cylinder being further extendible for pivoting the compacting structure and the door element about a member to the incline.

19. The self-propelled cotton harvesting machine of claim 18, wherein the at least one driver operable for moving the compacting structure and the door element and tilting them to the incline comprises a first fluid cylinder for moving the compactor and the door element between the operational position and the unloading position, and a second fluid cylinder operable for raising a forward end of the compactor when in the unloading position for tilting the compactor and the door element to the incline.

* * * * *